US010248928B2

(12) United States Patent
Dikman et al.

(10) Patent No.: US 10,248,928 B2
(45) Date of Patent: Apr. 2, 2019

(54) SYSTEMS AND METHODS FOR MANAGING AIRPORT LOUNGES

(71) Applicant: LoungeBuddy, Inc., San Francisco, CA (US)

(72) Inventors: Matthew Tyler Dikman, San Francisco, CA (US); Zachary Paul Altman, San Francisco, CA (US)

(73) Assignee: LoungeBuddy, Inc., San Francisco, CA (US)

( * ) Notice: Subject to any disclaimer, the term of this patent is extended or adjusted under 35 U.S.C. 154(b) by 278 days.

(21) Appl. No.: 14/678,760

(22) Filed: Apr. 3, 2015

(65) Prior Publication Data

US 2015/0286984 A1 Oct. 8, 2015

(51) Int. Cl.
*G06Q 10/00* (2012.01)
*G06Q 10/08* (2012.01)

(52) U.S. Cl.
CPC .................................. *G06Q 10/087* (2013.01)

(58) Field of Classification Search
None
See application file for complete search history.

(56) References Cited

U.S. PATENT DOCUMENTS

| | | | | |
|---|---|---|---|---|
| 6,920,319 | B2* | 7/2005 | Knutsson | H04W 4/02 342/450 |
| 2004/0203901 | A1* | 10/2004 | Wilson | H04W 64/00 455/456.1 |
| 2007/0075136 | A1* | 4/2007 | Jacob | G06Q 10/02 235/383 |
| 2012/0078667 | A1* | 3/2012 | Denker | G06Q 10/02 705/5 |
| 2012/0169457 | A1* | 7/2012 | Williamson | G07C 9/00103 340/5.2 |
| 2013/0226627 | A1* | 8/2013 | Kubovcik | G06Q 10/02 705/5 |
| 2014/0379390 | A1* | 12/2014 | Scarborough | G06Q 30/0639 705/5 |
| 2015/0269520 | A1* | 9/2015 | Knapp | G06Q 10/08355 705/338 |

* cited by examiner

*Primary Examiner* — Ariel J Yu
(74) *Attorney, Agent, or Firm* — Fay Sharpe LLP

(57) ABSTRACT

Systems and methods allow flyers to determine which airport lounges they may access. A flyer specifies an airport and access rules for lounges at the airport are applied to user data of the flyer to identify accessible lounges. A listing of the identified lounges is then displayed to the flyer. Systems and methods further allow management of airport lounge inventory. Inventory can be managed to increase occupancy, as well as to evenly distribute flyers within and across airport lounges.

19 Claims, 19 Drawing Sheets

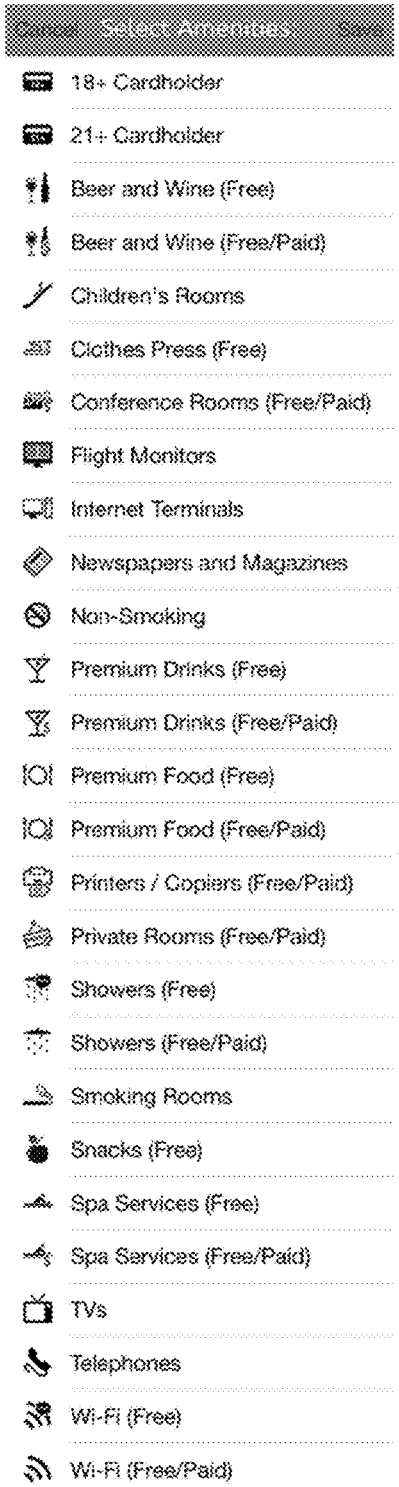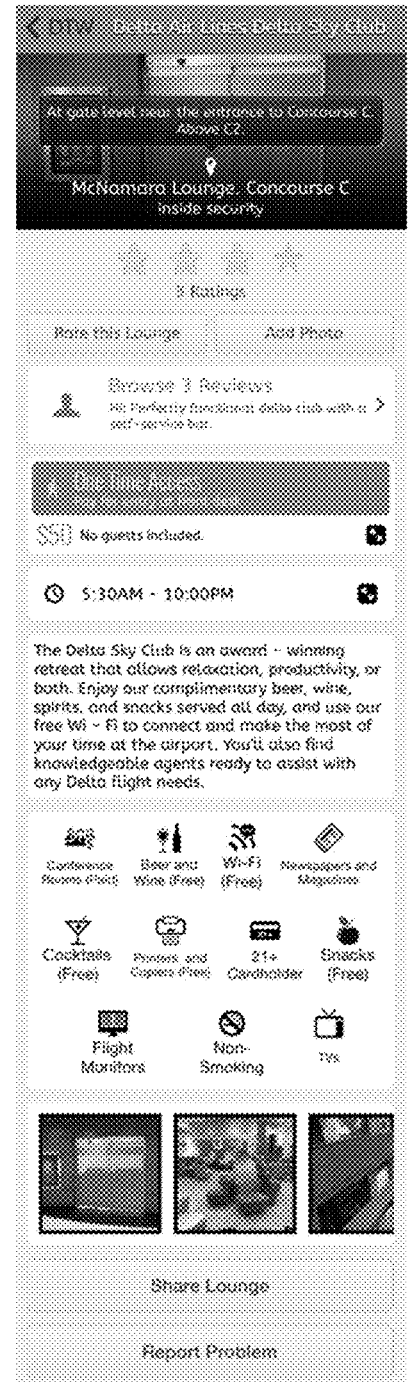
FIGURE 18
FIGURE 19

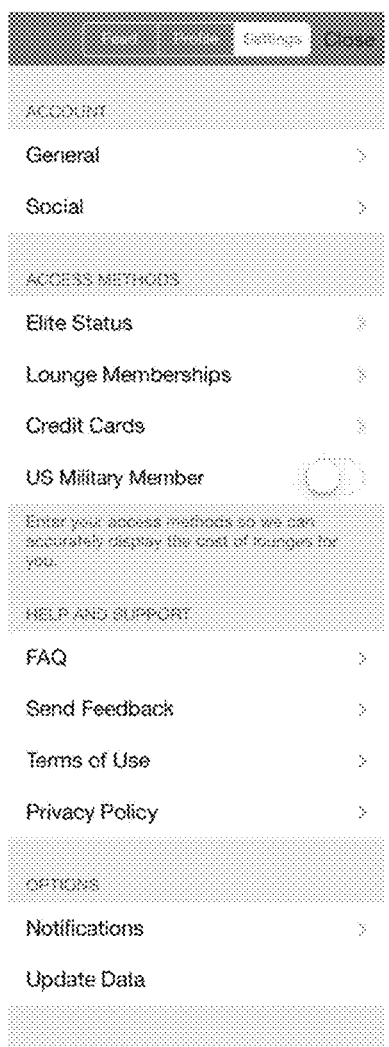
FIGURE 23
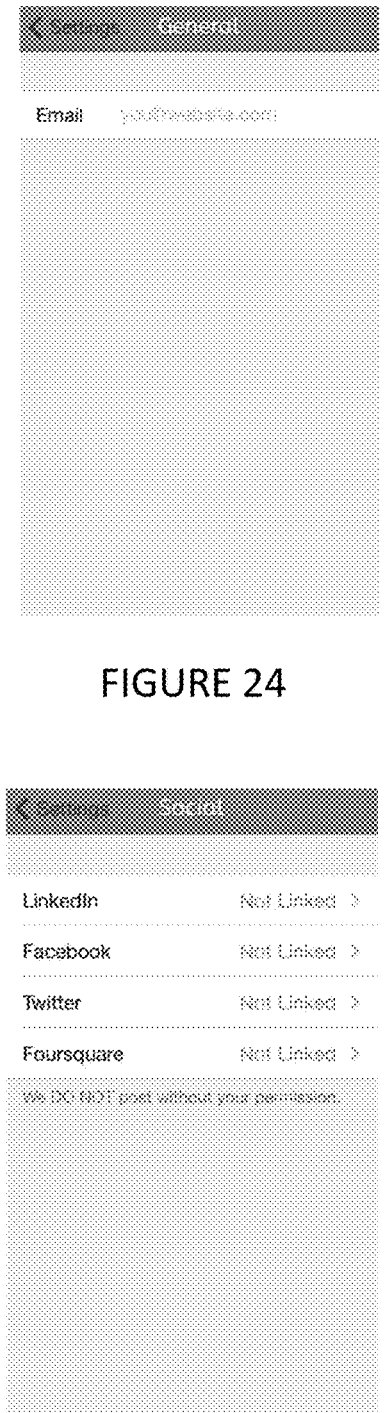
FIGURE 24
FIGURE 25

SYSTEMS AND METHODS FOR MANAGING AIRPORT LOUNGES

CROSS-REFERENCE TO RELATED APPLICATIONS

This application claims priority to U.S. Provisional Patent Application Ser. No. 61/975,251, filed Apr. 4, 2014, and titled, "Systems and Methods for Managing Airport Lounges", the entirety of which is incorporated by reference herein.

BACKGROUND

The present exemplary embodiment relates to inventory management. It finds particular application in conjunction with airport lounges, and will be described with particular reference thereto. However, it is to be appreciated that the present exemplary embodiment is also amenable to other like applications.

Airport lounges provide a place to relax, be productive, freshen up, or just get away from the hectic atmosphere of airports. In the past, airport lounges were the domain of first class flyers and frequent flyers that spend significant amounts of time in airports. Casual flyers had little interest in airport lounges. However, in recent times, air travel has seen increasing numbers of delays, cancellations, diversions, and misconnects. Even casual flyers can spend significant amounts of time in airports. Hence, there is increasing interest amongst casual flyers for airport lounges.

A challenge facing flyers with interest in airport lounges is the lack of knowledge regarding the availability of lounges and the amenities offered by lounges. Around the world there are hundreds, if not thousands, of lounges with differing access rules and differing amenities. However, flyers don't have a centralized computer system they can visit to properly assess the availability of all lounges. Rather, flyers merely have centralized computer systems for groups (but not all) of lounges. Hence, flyers typically need to access several centralized computer systems, physically visit the lounges, and/or directly contact the lounge operators to fully assess all available lounges. This can be burdensome and may dissuade flyers from accessing lounges.

Central directories providing flyers with a listing of airport lounges and amenities offered by the lounges are known. However, the directories are poorly suited for assessing the availability of lounges. The directories do not incorporate dynamic updates to access rules of the lounges or data regarding the occupancy of the lounges. Rather, the directories merely identify static access rules, such as membership requirements and hours of operation.

On the other hand, a challenge facing operators of airport lounges is the operators' inability to effectively provide flyers with information regarding the airport lounges. Lounge operators may be willing to allow access to lounges for reduced prices during certain periods, such as slow periods, but typically have no way of effectively conveying this to flyers. Hence, lounge operators may lose out on sales.

Another challenge facing operators of airport lounges is that the airport lounges are typically managed by proprietary computer systems which implement only the most basic of functionality. The proprietary computer systems can verify access rules, allow reservations, and monitor the ingress and egress of flyers. However, the proprietary computer systems lack the ability to dynamically adjust the access rules based on conditions within the lounges. Further, the proprietary computer systems lack the ability to dynamically adjust the distribution of the flyers within the lounges.

The present application provides a new and improved system and method which overcome these problems and others.

BRIEF DESCRIPTION

In accordance with one embodiment, there is provided a system for dynamically managing airport lounge inventory. The system includes an application server having a processor and associated database. The database includes a plurality of access rules that correspond to access to a corresponding plurality of associated airport lounges and an inventory corresponding to an available capacity in each of the plurality of associated airport lounges. The application server further includes memory in communication with the processor that stores instructions which are executed by the processor for receiving an access request from an associated airport lounge application resident on an associated client device. The memory further includes instructions for receiving at least one access item associated with the access request, and determining whether at least one of the plurality of airport lounges is accessible for a user of the associated client device in accordance with the received access request and the at least one access item. The memory also stores instructions for communicating a response to the access request to the associated client device based upon the accessibility determination.

According to another embodiment, there is provided a method for dynamically managing airport lounge inventory. The method includes receiving, at an application server having a processor and memory storing instructions executable by the processor, an access request from an associated airport lounge application resident on an associated client device, the access request including at least one access item. The method further includes retrieving, from a database in communication with the application server, a plurality of access rules corresponding to access to a corresponding plurality of associated airport lounges, and retrieving, from the database, an inventory corresponding to an available capacity in each of the plurality of associated airport lounges. The method further includes determining whether at least one of the plurality of airport lounges is accessible for a user of the associated client device in accordance with the received access request, the corresponding inventory, and the at least one access item. In addition, the method includes communicating a response to the access request based upon the accessibility determination.

According to another embodiment, there is provided a computer-implemented method for requesting access to inventory of an airport lounge inventory. The computer-implemented method includes requesting, via an airport lounge application resident on a client device having a processor and memory storing instructions executable by the processor, an available airport lounge, the request including at least one access item and a current location of the client device. The computer-implemented method further includes establishing a first communication link with an associated application server having a processor and memory storing instructions executable by the processor, and receiving, from the associated application server, a response to the access request, the response comprising access details corresponding to access to the at least one airport lounge. The computer-implemented method also includes receiving from the associated application server confirmation information relating to access to the at least one airport lounge. In addition, establishing a second communication link with an associated client management device located in association with the at least one airport lounge, the second communication link distinct from the first communication link. Furthermore, the method includes communicating, via the second communication, the access details associated with access to the at least one airport lounge

BRIEF DESCRIPTION OF THE DRAWINGS

FIGS. 5-49 and 54 illustrate an example airport lounge application/graphical user interface (GUI) according to one embodiment of the subject application.

DETAILED DESCRIPTION

Figure 1:
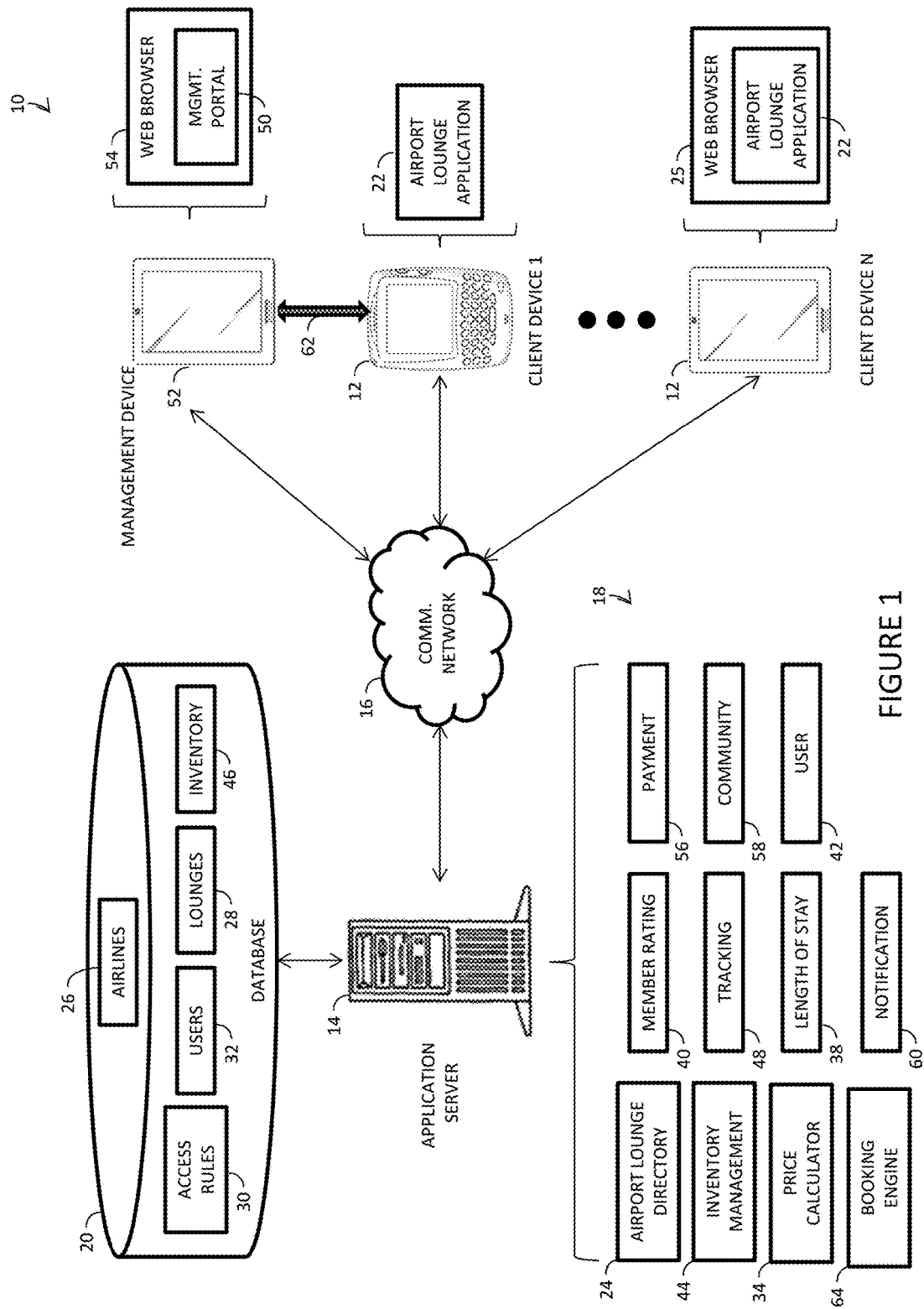
FIG. 1 illustrates a lounge management system for airport lounges according to one embodiment of the subject application.

One or more implementations of the subject application will now be described with reference to the attached drawings, wherein like reference numerals are used to refer to like elements throughout.

The present application describes systems and methods allowing flyers to determine which airport lounges they may access. A flyer enters an itinerary, as well as access items to access rules for lounges. The access items may include, for example, any elite status, lounge memberships, and credit cards. The flyer may then select an airport of the itinerary. Upon selection, the lounges of the airport and the corresponding access rules are retrieved. The access rules are applied using the access items to determine which of the lounges may be accessed by the flyer. The flyer may then select an accessible lounge and virtually explore the lounge. For example, the flyer may browse photos and amenities of the lounge, as well as view real photos and reviews from other flyers.

The present application further describes systems and methods allowing a lounge operator to dynamically manage the inventory (i.e., the capacity or spaces within lounges). The occupancy of the lounge and the distribution of flyers within the lounge are monitored. Based on the monitoring, the access rules can be dynamically updated by changing the requirements to access the lounge to maximize the occupancy of the lounge. Further, based on the monitoring, employees of a lounge can be instructed to take action (e.g., add food to an unused area of the lounge) to even out the distribution of flyers within the lounge. Moreover, based on the monitoring, prices for lounge access can be varied. For example, prices can be reduced in response to low occupancy.

With reference to FIG. 1, a lounge management system 10 for airport lounges is provided. The airport lounges are operated by lounge operators, and typically have differing access rules and differing amenities. The system 10 includes one or more (i.e., N>0) client devices 12 communicating with an application server 14, typically over a communications network 16. The communications network 16 is typically the Internet, but can be any communications network, such as a local area network, a wide area network, a Bluetooth personal area network, etc. The client devices can also communicate with the application server over a Bluetooth communications link, a near field communication (NFC) link, or other peer-to-peer communications link.

The application server 14 manages the inventories of the lounges (i.e., the available spaces) for the lounge operators and provides flyers with access to the inventories. Further, the application server 14 is managed by a service provider, typically a third party different than the lounge operators, and includes a processor and a memory storing processor executable instructions executed by the processor. The processor executable instructions are grouped into modules 18 and, when executed by the processor, cause the application server 14 to carry out the server-side functionality described hereafter. The application server 14 further includes a database 20 storing data about the airport lounges (e.g., reviews, amenities, pictures, etc.), access rules describing the requirements for flyers to access the lounges, user records describing flyers and lounge operators, available inventory (i.e., number of spaces used and available in the lounges), and data about airline routes.

The client devices 12 allow flyers to access the application server 14. Each client device 12 includes a processor, a memory, a display device and a user input device. The processor executes processor executable instructions stored in the memory to provide a flyer with a graphical user interface (GUI) with the display device and the user input device. The processor executable instructions include an airport lounge application 22 implementing the client-side functionality described hereafter. The airport lounge application 22 can be a standalone application, as illustrated by client device 1, or a web application, as illustrated by client device N. Further, the airport lounge application 22 portions thereof can be integrated with other systems/platforms, such as TRIPIT and CONCUR's Expense Management system. Where the airport lounge application 22 is a web application, the airport lounge application 22 is executed within a web browser 25 of the processor executable instructions. The client devices 12 are typically portable devices, such as smartphones, laptops, or tablet computers.

In some instances, the client devices 12 locally cache or otherwise store data of the application server 14, typically frequently accessed data of the application server 14, in corresponding memories. For example, one or more of rules, users, lounges, etc. can be stored locally on the client devices 12. The client devices 12 can then make use of this data without requiring communication with the application server 14 over the communications network 16.

Using the airport lounge application 22, a flyer can search for an accessible lounge. In that regard, the flyer selects an airport with the airport lounge application 22. The airport can be selected as part of an itinerary of the flyer. Typically, the user is presented with a complete list of airports from which they can select the airport. However, in other instances, only a nearby airport (e.g., as determined from a location service of the client device 12) is presented and the user can immediately select the airport. The nearby airport is treated as a starting airport for a new trip. Alternatively, no manual selection is performed and the nearby airport is automatically selected. The complete list of airports can be maintained locally on the client device 12 or remotely on the application server 14. The application server 14 can maintain the list in the database 20.

In some instances, when an airport is selected, a list of probable routes (if any) based on the current airline selected and the current trip thus far (if any) are displayed. The flyer can then select the flyer's route. The list is retrieved over the communications network 16 from an airport lounge directory (ALD) module 24 of the application server 14, which retrieves the list from an airline section 26 (e.g., table) of the database 20. The airline section 26 includes routes for each airline. The ALD module 24 may take into account previous routing selected by the user, routing based on delays, routing based on time of year, routing based on future trips, routing based on time of day/location/intent. The intent refers to an inference of the flyer's future actions. In this way, relevant routes will appear by default (e.g., before searching) when adding airports to a trip.

Further, in some instances, the flyer further specifies one or more access items with the airport lounge application 22. An access item is a data field used by access rules to assess whether a flyer may access a lounge. The access items may be stored locally or remotely for subsequent use so the flyer doesn't have to specify the access items each time they search for an accessible lounge. Examples of access items include one or more of any of the following: elite statuses, lounge memberships, frequent flyer accounts, credit cards (e.g., type, or connecting accounts), bank accounts, military status, day passes (e.g., may include serial code of day pass), third party lounge provider accounts/memberships (e.g., including but not limited to PRIORITY PASS, Airport Angel, or Plaza Premium), current trip information (e.g., including but not limited to flight segments, flight numbers, airline, class of service, and airports), and any special privileges awarded by the system.

Once the airport is specified, a request for accessible lounges is formulated. The request includes the specified airport and, optionally a unique identifier of the flyer, a route, and/or access items specified by the flyer. In some instances, the application server 14 may query a third party provider, e.g., airline database, for information relating to terminal number and departure gates, arrival gates (current trip), passport or security controls, or the like. The query results may be used by the application server 14 during processing of the request to ascertain the accessible lounges for the flyer. In one implementation, the application server 14 may generate one or more warnings in and response, the warnings associated with accessible lounges based upon the relative proximity of the accessible lounge to the flyer's arrival or departure gate, the flyer's terminal, or the like. The request is then transmitted over the communications network 16 to the ALD module 24 of the application server 14, which processes the request. In processing the request, the ALD module 24 identifies all the lounges at the airport from a lounge section 28 of the database 20 and retrieves sets of access rules for each of the identified lounges from an access rules section 30 of the database 20. Access rules are then applied to user data of the flyer, including access items for the flyer, to determine which of the identified lounges are accessible to the flyer. As noted above, the access items can be included in the request. Alternatively, the access items can be stored in a user section 32 of the database indexed by the unique identifier of the flyer.

Each lounge has a set of access rules defining the requirement for access to the lounge. Rules may be shared between lounges. Further, rules may only apply on specific hours, days, weeks, or periods of the year. A rule includes requirements for the rule to be met and may also include a title/name, associated notes, additional instructional material, etc.

In order for a lounge to be accessible to a flyer, the flyer must meet the requirements of a rule (or in certain cases more than one rule). The requirements can include, but are not restricted to, access items, ticket class(es), fare class requirements, cost, region requirements (e.g., within or excluding a specific region or region(s)). A region is defined by the system 10. An example of a region is 'US', which includes airports in the US. Another example of a region is 'North America', which includes airports in the North American region. The requirements can further include, but are not restricted to, specific airlines or alliances or alliance tiers (e.g., the flyer must be flying on these, or cannot be flying on these), routes (e.g., SFO-LAX or SFO-LAX-JFK), specific flight number(s) (e.g., DL17), segment state (e.g., arriving, departing, or both).

An access rule also returns details regarding the flyer's access including but not limited to: cost (e.g., free or paid); duration limit (e.g., 2 hours); and included services (e.g., spa treatment, premium drink coupons, etc.). The returned detail can also include information on guest access including but not limited to: included guests permitted with flyer (e.g., spouse/significant other/partner, child, other, etc.); additional guest cost; guest requirements (e.g., any of the requirements above); alternative requirements (e.g., guests must be traveling on the same airlines, alliance, alliance tier, ticket, class of service, day or daypart); and a limit to the number of paid guests allowed.

After determining which of the identified lounges are accessible to the flyer, the ALD module 24 generates a response. The response includes a listing of the identified lounges, as well as details returned by the access rules met by the flyer. Typically, the returned details include specific prices for accessing the identified lounges. However, where the returned details exclude the specific prices, the specific prices are calculated by a price calculator module 34 of the application server 14 and included in the response. The generated response is then transmitted to the airport lounge application 22 over the communications network 16. The airport lounge application 16 presents the flyer with the available lounge and the returned details and the specific prices. As discussed above, the returned details can include, for example, pricing options (e.g., free or paid). The flyer may filter or sort the accessible lounges by cost (e.g., free, paid, all, accessible, etc.), terminal, name, available amenities (e.g., showers, snacks, premium food, drinks, private rooms, and spa services), and so on. Further, the listed lounges (or access method) can be ordered based on price, benefits (including but not limited to guest access, included drinks), time allowed in lounge, guest cost, ease of entry, etc.

The flyer may further select a lounge to be presented with additional information regarding the rule(s) granting the user access to the lounge. This additional information can include, but is not limited to, one or more of the specific price for accessing the lounge, guests permitted, guest restrictions, guest cost, lounge notes, and access instructions. Further, the additional information can include photos and amenities of the lounge, as well as view real photos and reviews from other flyers. The user may also contribute photos, ratings, reviews, etc. to the selected lounge. Even more, the flyer may select a lounge to make reservation.

Figure 2:
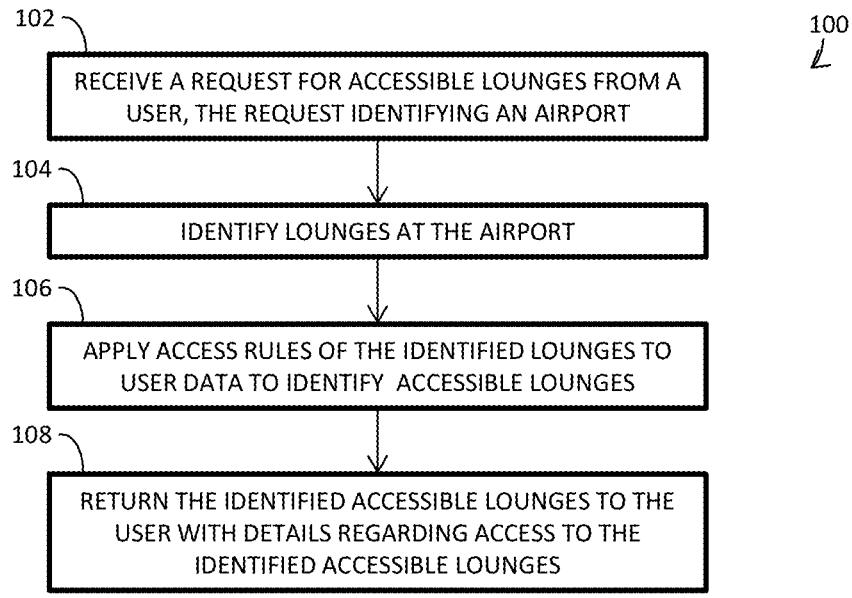
FIG. 2 illustrates a method for searching for an accessible airport lounge according to one embodiment of the subject application.

With reference to FIG. 2, a method 100 for searching for an accessible lounge is provided. The method 100 summarizes the foregoing discussion and is suitably performed by the ALD module 24. According to the method 10, the ALD module 24 receives a request for accessible lounges from a flyer. The request identifies an airport and optionally includes user data, such as access items, a flight route, or a unique identifier. Lounges at the airport are then identified in the database 20 and the sets of access rules for the identified lounges are obtained from the database 20. Optionally, additional user data is obtained from the database 20 using, for example, the unique identifier. The access rules are then applied to the user data to identify which of the identified lounges are accessible to the flyer. A listing of the identified accessible lounges is returned to the flyer, along with details of the access granting the flyer access the identified accessible lounges.

Referring back to FIG. 1, the price calculator module 34 calculates the price to access a lounge. A specific price for lounge entry is determined for a flyer, a set of flyers, or all flyers, based on one or more of a user account with the system 10, the time of access (e.g., may be now, or a time in the future), current or estimated capacity of the lounge, value of a customer (e.g., new customer, loyal customer, frequent flier accounts/status, ticket, airline, class of service, current trip details, etc.), lounge rating, lounge popularity, lounge value relative to other establishments (e.g., nearby or otherwise), lounge value to the flyer wanting entry (e.g., proximity to gate, or amenities offered), and time in lounge (estimated, or hard value). Through cooperation with the ALD module 24, a user performing a search for lounges will see the price calculated by the price calculator module 34 for each lounge identified as accessible.

In some instances, a length-of-stay module 38 of the application server 14 estimates the amount of time a flyer will stay at a lounge. The estimate can be based on one or more of current ticket, proximity to gate/other amenities, intent (including but not limited to shower, meeting, meal, drinks, relaxation, sleep, and work), flight status, previous 'stay' data (past actions). The intent refers to an inference of the flyer's future actions. The data can be collected from a profile of the flyer stored in the user section 32 of the database 20. The price calculator module 34 can base price calculations on the estimate.

In some instances, a member rating module 40 of the application server 14 maintains a member rating for each flyer using the system 10. The member ratings for flyers is stored in the users section 32 of the database 20 and increases based on contribution (e.g., photos, check ins, ratings, reviews, transactions, and other activities), value of contribution (e.g., likes/dislikes of contribution, frequency, etc.), value based actions (e.g., entering credit card, transactions, etc.), etc. Contributed content (e.g., photos) is given a 'value' score. Value score is determined by the member status, member value, frequency of contribution, uniqueness of content, relevance of content, age of content, etc. The value score can be factored into a member rating. The member ratings can further decrease over time. For example, a member rating may decrease to zero over a period of a month unless counteracted. As another example, a member rating may be maintained until a specific date at which point it is reset. The specific data may be, for example, 30 days from the last activity increasing the member rating. To reward flyers using the system 10 and to provide perks for their activity with the system (e.g., contributions), the specific prices for lounge entry may take into account member ratings and/or the access may take into account member ratings.

With continued reference to FIG. 1, a user module 42 of the application server 14 maintains accounts for flyers in the user section 32 of the database 20. The flyers create accounts upon first using the system 10. When an account is created, it is tied to a specific email, phone, and/or device. Before the account can be properly created, the email/phone/device must be verified through the use of a unique code/message/piece of information. The code/message/information is sent to the email/phone/device and the user must then provide the code to the user module 42 (e.g., by way of the airport lounge application) to link the account. Once an account is linked, if the user ever needs to connect the account again, the user selects their phone/email/device and a unique code/message/information is sent to the phone/email/device to verify that the user is the owner of that phone/email/device. Additional phones, email addresses, and devices can be linked. This advantageously allows people to have an account and link additional devices based on an email/phone alone. This is different from the usual password verification as the user does not have to remember a secondary 'secret' piece of information.

One embodiment of the subject application utilizes the information supplied during a TRIPIT purchase of lounge access to reserve an account on the application server 14, such that at a later time, should the flyer desire to register with the application server 14, the application server 14 is configured to utilize this purchase information to pre-populate the reserved account, thereby saving the flyer time during the registration process. The credit-card and purchase history, e.g., purchase of lounge access, of the flyer using TRIPIT are capable of being communicated and/or stored by the application server 14, wherein the application server 14 reserves an account name for the flyer in anticipation of the flyer registering with the application server 14 at a later time.

An inventory management module 44 of the application server 14 tracks all inventory (i.e., tracks flyers entering and leaving lounges). The inventory data is stored within an inventory section 46 of the database 20. The price calculator module 34 can cooperate with the inventory management module 44 when calculating specific prices. Further, the inventory management module 44 can dynamically update the access rules for lounges based on available inventory. The inventory management module 44 further allows flyers to make reservations (i.e., reserve spaces in lounge accessible to them).

To track when flyers check-in and check-out, the inventory management module 44 can cooperate with a tracking module 48 of the application server 14 or an external system, such as proprietary computer systems local to the lounges that track check-in and check-out of flyers. The tracking module 48 can track the location of flyers based on, for example, WiFi, iBeacon, Bluetooth, etc., typically received from the airport lounge application 22. A flyer can then be checked in or checked out automatically upon entering or leaving a lounge. The inventory management module 48 can further track people entering and leaving lounges based on flight time or based on user input from the airport lounge application 22 (e.g., a flyer can manually press check in or check out buttons). As to the latter, a flyer can be presented with survey questions (e.g. how busy is the lounge currently?) upon manual check in or checkout by way of the airport lounge application 22. As to the former, flight delays, disruptions, changes, and cancellations can be taken into account. Based on historical inventory data stored in the inventory section 46 of the database 20, an estimate of the number of flyers in a lounge on future dates and time periods can be determined. This can also take into account expected delays that may be due to weather or seasonal popularity.

A flyer can be automatically checked in or checked out using local data, such as WiFi data, Bluetooth data, manually entered location data, and sound data, collected by the tracking module 48 from the airport lounge application 22. This local data will then be analyzed by the tracking module 48 to identify the location of a flyer. Through cooperation with the tracking module 48, the inventory management module 44 can check in or check out a flyer based on whether the flyer is within the lounge and the intent of the flyer. The intent refers to an inference of the flyer's future actions. This inference may account for upcoming flights (including delays), calendar events (meetings), viewing lounges, viewing airports, etc. For example, if a flyer disconnects from the lounge WiFi network, this may be an indicator that the flyer has left the lounge.

In accordance with one embodiment of the subject application, the client device 12 and the management device 52 are configured to dynamically establish a peer-to-peer communications network 62 therebetween. For example, the peer-to-peer network 62 may be implemented as a BLUETOOTH personal area network. Other types of communication links may be utilized in addition to BLUETOOTH, including, for example and without limitation, infrared, RFID, NFC, and other suitable device-to-device communication links as will be appreciated by the skilled artisan.

In such an embodiment, when one of the devices 12 or 52 loses its communication link with the application server 14, e.g., no cellular coverage, loss of wireless connection, Internet service provider (server) down, offline mode, etc., the device 12 or 52 that remains in communication with the application server 14 is configured to facilitate communications between the offline device 12 or 52 that lost communications with the application server 14. According to one implementation, when the management device 52 loses connectivity with the application server 14, the offline management device 52 is able to continue a check-in process of the flyer utilizing the communication capabilities of the client device 12. This offline type of check-in utilizes the access determination and reporting of the client device 12 for either new transactions at the point of entry to the lounge, existing entries (based on access rules 30/pre-purchases), or the like. According to another implementation, when the client device 12 loses internet connectivity, during, for example, an access purchase transaction, the application 22 resident on the client device 12 automatically utilizes the internet connectivity of the management device 52 to communicate with the application server 14 to complete the transaction and secure access to the lounge.

Alternatively, the management device 52 may store, in associated memory, the check-in details received via the communication network 62 from the client device 12 until such time as the management device 52 reestablishes communication with the application server 14. For example, when the management device 52 is offline, the client device 12 may communicate some credential (access item) that can be input into the management device 52. The management device 52 may be configured to determine whether the flyer has eligible access to the corresponding lounge based upon that access item, store the access item, allow access to the flyer associated with the client device 12, and communicate the relevant information to the server 14 upon reconnection to the Internet. As will be appreciated, the airport lounge application 22 is configured to recognize this failure of the management device 52 to establish a communication channel to the application server 14, thereby initiating the aforementioned peer-to-peer network 62.

According to a further embodiment, should both devices 12 and 52 lack connectivity to communicate with the application server 14, but after successful completion of a purchase by the device 12, a QR code may be generated on the display of the client device 12. The QR code, in such an embodiment, incorporates sufficient information to enable the management device 52 to recognize a valid access of the flyer into the lounge. The QR code may include purchase information, data relating to access items, confirmation information, or other data that may be used by the offline management device 52 to verify against the access rules 30 of the corresponding lounge, so as to allow the flyer access. The QR code may include the flyer's airline, class of service, or the like, which may be interpreted by the offline management device 52 so as to determine whether that flyer may be admitted to the lounge. It will be appreciated that other indicia may be generated on the display of the client device 12 and read by the management device 52, and the QR code is intended as a non-limiting example thereof. Other means of communicating the above-identified information may comprise using the aforementioned peer-to-peer communications link 62 with a transmission of the relevant data from the client device 12 to the offline management device 52. The management device 52 may then store the access information relating to the flyer until such time as connectivity with the application server 14 is reestablished, whereupon the stored information is communicated thereto for recordation.

Figure 4:
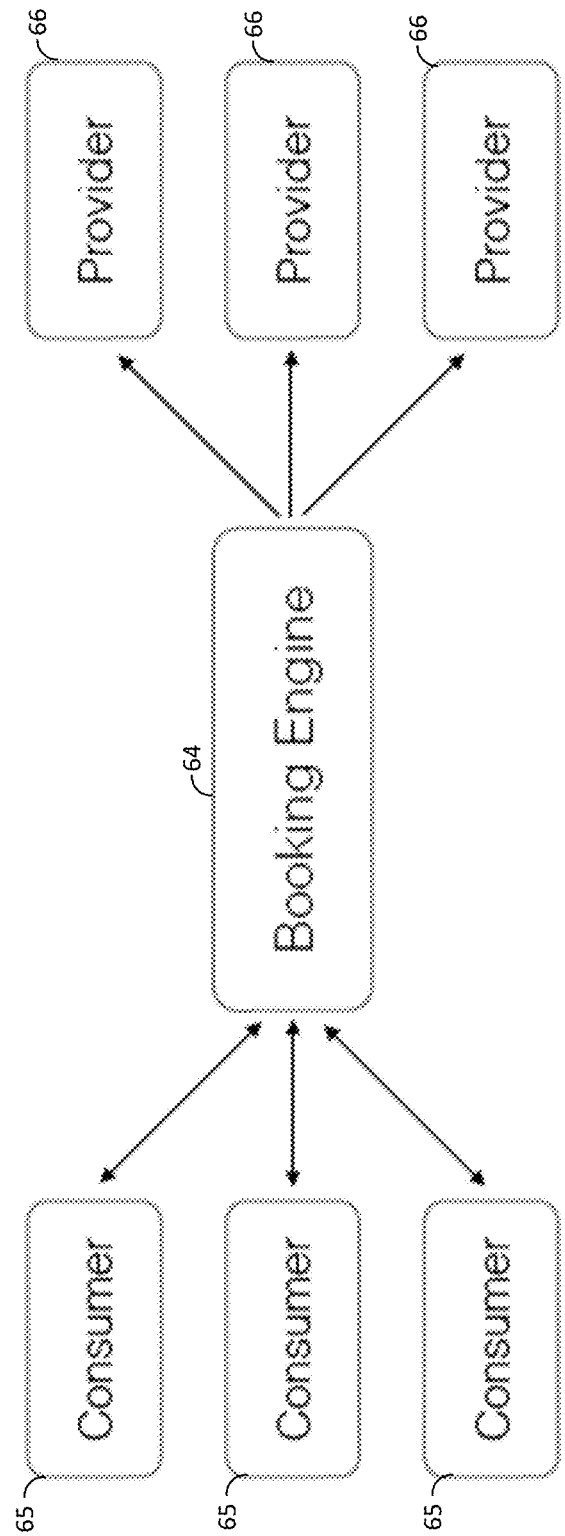
FIG. 4 illustrates a block diagram illustrating a booking engine implementation according to one embodiment of the subject application.

In accordance with one embodiment, the application server 14 may include a booking engine 64, which operates in conjunction with the inventor management 44 and the price calculator 34. FIG. 4 provides a block diagram illustration of the functionality of the booking engine 64. In such an embodiment, the booking engine 64 functions as a mediator between different clients 65, e.g., the application 22, TRIPIT mobile checkout, PRICELINE bundles, and other third party access purchasing avenues (providers 66), and facilitates the communication of information to the providers, e.g., the management portal 50, the application 22, PLAZA PREMIUM, or other suitable third party lounge providers. Accordingly, the booking engine 64 component of the application server 14 functions as a mediator between clients 65 and providers 66. Other implementations of the aforementioned booking engine 64 may also be undertaken in accordance with the systems and methods discussed herein.

In some instances, the application server 14 is configured to interact with a partner system, e.g., TRIPIT. In the event that the TRIPIT server (not shown) running an application programming interface (API) exceeds a threshold response time, i.e., response time greater than ten seconds, the application server 14 utilizes the incomplete information received from the API and generates a transaction corresponding to the received information. In this manner, it will be appreciated that slow systems through which a flyer is accessing are able to quickly respond to queries for lounge access.

In other instances, the application server 14 utilizes a push notification service, e.g., APPLE, GOOGLE, or the like, to remotely monitor the management device 52, retrieve inventory 46 information, connectivity with the application server 14, and the like. The subject application utilizes the acceptance of a push notification from APPLE or GOOGLE to the management device 52, i.e., a tablet device, as an indication that the management device 52 is online. A secondary benefit of this use of a third party push notification is that the management device 52 may be instructed to return information to the application server 14, without requiring the application server 14 to spend time trying to initiate communications with an offline management device 52, Accordingly, the application server 14 communicates a message for the management device 52 to the APPLE or GOOGLE server, which then pushes the message out to the management device 52.

Lounge management personnel (e.g., front desk attendee(s)) can access a management portal 50 provided by the inventory management module 44 as a web application over the communications network 16. Alternatively, instead of being a web application, the portal 50 can be a standalone application communicating with the application server 14 (e.g., the inventory management module 44). The portal 50 allows management personnel to input entrant data as flyers are admitted to a lounge (including, but not limited to, flight number). The portal 50 further allows lounge management personnel to modify the access rules for the lounges. For example, the management personnel for a lounge can set aside specific hours of entry with a limit as to the number of people allowed to enter. As another example, management personnel for a lounge can set up recurring periods (e.g., 10 people between 2-4 PM daily, or 10 people between 2-4 PM every Wednesday) and blackout dates and/or times (e.g., no entry on Christmas day).

To access the portal 50, management personnel employ one or more management devices 52 of the system 10. The management devices 52 are typically located on-site at the lounges. Each management device 52 includes a processor, a memory, a display device and a user input device. The processor executes processor executable instructions stored in the memory to provide a manager with a GUI with the display device and the user input device. In some embodiments, the processor executable instructions include a web browser 54 within which the portal 50 is run (e.g., when the portal 50 is a web application). Alternatively, the processor executable instructions implement the portal 50 as a standalone application. The management devices 52 are typically desktop or laptop computers.

According to one embodiment, the management device 52, implemented as a portable electronic device such as a tablet, incorporates several methods of accepting a flyer into the associated lounge. The management device 52, regardless of whether access is via the application 22, a membership in the lounge, a detail of the flight, is capable, via the communications network 16, of verifying access and recording the flyer's entry. In such an embodiment, the management device 52 utilizes the web browser 54, transparent to the user of the management device 52, which enables the management device 52 to scan or otherwise collect the necessary information relating to membership in the lounge (or other reciprocal association), and provide that information to the membership site (not shown), thereby allowing access to members of such an association without requiring personnel to manually open the membership's website and input the necessary information. This implementation alleviates the need to provide custom APIs for both the management device 52 and the third party provider. Thus, in place of personnel manually accessing the website and inputting the information, the management device 52 is configured to load the website in a background process, populate any required input field (e.g., name, flight information, membership number, etc.), and require confirmation of information by personnel at the lounge, whom then receives confirmation of the access or rejection.

For example, a membership model-based lounge access association, such as PRIORITY PASS (offered via AMERICAN EXPRESS) or directly purchased by a consumer, has over ten million members. The associated PRIORITY PASS card can be processed in several ways. A first manner is through a web browser, wherein each airport lounge includes a booster terminal with associated magnetic card swipe or scanner, allowing a flyer or lounge personnel to swipe the card or key it in manually. Within the web browser, through a PRIORITY PASS website, the transaction for entry is processed and a receipt may be printed, whereupon the flyer signs the receipt, the transaction is completed, and the flyer enters the lounge. A second manner of entry is through a handheld credit card like processing machine, i.e., dedicated communication link without requiring instantiating a separate web browser. A third way is through a carbon copy swipe, whereupon physical hardcopies are suitably communicated via mail to the appropriate parties.

The aforementioned embodiment of the subject application provides for access similar to the first manner described, however such access is automatically handled by the management device 52 without requiring navigation to a specific website. As described above, personnel at the lounge would swipe the card via an associated reader of the management device 52 whereupon software, hardware, logic, or other suitable code or components of the management device 52 would automatically recognize that the swiped card is a PRIORITY PASS card, followed by performing a set of actions as if an individual were swiping it through the aforementioned booster terminal, putting in any other details, hitting the confirmation and accepting the access. It will be appreciated that the management device 52 described in the preceding example therefore eliminates extraneous equipment necessary for access rights distinct from the lounge application 22 of the subject application, allowing check-in of lounge application 22 flyers, as well as check-in of other flyers, without direct communication between an API of the management device 52 and an API resident on the PRIORITY PASS server.

In some instances, the inventory management module 44 monitors for upsell opportunities. This can be performed at all times or only during times when additional capacity is expected to be available. The monitoring can take into account the location of flyers using tracking module 48 and/or data from the external systems. An upsell opportunity can occur at check in, time expiry (e.g., only allowed 2 hours in the lounge), location within lounge (e.g., bar), proximity to specific amenities (e.g., business center or showers), and booking of access.

Upon detecting an upsell opportunity, the flyer can be offered an opportunity to continue accessing the lounge. For example, supposing a flyer's time in a lounge expires, the flyer can be presented with an offer to extend the time. Further, upon detecting an upsell opportunity, the flyer can be offered an upgrade to the flyer's experience. Upgrades to the flyer's experience can include access to a premium section of the lounge, such as an upgrade from the business class to the first class section, or include premium food and/or drinks, private rooms, showers, spa services, or other premium amenities.

An upsell offer can be visually presented to a flyer by way of the airport lounge application 22 over the communications network 16. Other means of communicating with the flyer can also be employed, such as email, push notifications, or short message service (SMS). Alternatively, instead of directly communicating with the flyer, the offer can be communicated to an agent, such as a check-in agent, at the lounge where the flyer is located and the agent can notify the flyer of the offer. Communication with the agent can be performed through the portal 50 or cooperation with a computing system local to the lounge. Other means of communicating with the agent, such as email, are also contemplated.

In some instances, the application 22 may prompt the flyer to share or otherwise disseminate information regarding the application 22 to social media sites. The prompting may include a reward of miles for a partner airline, upgrades to lounge access, or the like. The rewards may be suitably tied to the flyer's account with the application 22, a frequent flyer account, a TRIPIT account, or the like.

In some instances, the inventory management module 44 may allow unused inventory to be sold by flyers. As discussed above, the access rules may allow a flyer to provide a certain number of guests with access to a lounge. When it is determined that a flyer has guest access privileges for a specific lounge at a specific time, the inventory management module 44 may permit the flyer to make these guest invites available to others (e.g., sold). Typically, a flyer has guest access privileges to a lounge when the applicable access rules of the lounge permit the flyer to have guest access and the flyer has committed to accessing the lounge at a specific time or has checked in to the lounge.

The guest invites are stored in the inventory section 46 of the database 20. In some instances, the guest invites have limits based on the access rules (e.g., guest must be flying the same carrier, alliance, or in the same terminal). Further, in some instances, the flyer must be verified before the guest invites can be made available to others. For example, the flyer may have to verify the flyer's elite status, credit card type, membership, ticket class, flight, etc. by providing this information to the inventory management module 44 through the airport lounge application 22.

Assuming a flyer is permitted to make guest invites available to others, the inventory management module 44 notifies the flyer of such through the airport lounge application 22 and allows the flyer to transfer the guest invites. A flyer can make guest access available to others at the time the flyer enters a lounge, or in advance (e.g., to make inventory available in advance for future bookings). Where a flyer has multiple methods of accessing a lounge (i.e., multiple access rules allow the flyer access to the lounge), the inventory management module 44 determines which method offers the greatest value to the flyer (e.g., including the greatest number of guest invites in the event the user has multiple access methods).

When a flyer performs a search for accessible lounge, the ALD module 24 can coordinate with the inventory management module 44 to identify guest inventory. If the search can be matched with an available guest spot at a lounge, the lounge will be returned with other lounges accessible to the flyer. Guest spots are associated with a price (e.g., determined by the price calculator, set by the seller, etc.), or a non-monetary value (e.g., 'points' or 'credits'). When viewing the list of accessible lounges, the flyer will see guest inventory as an option for purchase.

Supposing the searcher is interested in a guest invite to a lounge, the searcher submits a request for access to the lounge by way of the guest invite to the inventory management module 44. The requestor is then matched with a flyer providing the guest invite. If there is more than one flyer that can provide the guest invite, the flyer selected is based on customer value, rating from past transactions, estimated time of departure, and number of past transactions.

Supply of the guest invite is then verified with the selected flyer, while the requesting flyer is notified by the airport lounge application 22 to wait for availability to be confirmed. Supply can be verified by, for example, one or more messages and/or notifications sent to the selected flyer to verify that they're interested in providing the guest invite. The messages and/or notifications request confirmation that the selected flyer is available to accept the requesting flyer's desire to enter lounge. The messages and/or the notifications can be sent to the selected flyer by way of the airport lounge application 22 or other messaging channel, such as email, push notifications, or SMS. In some instances, additional verification (e.g., multiple messages) and/or additional assistance from the system may be needed if the selected flyer has never before provided a guest invite.

Once the person providing access has verified that they are available, payment is made between the flyer providing access and the flyer requesting access. For example, money or points are transferred between these parties. Payment can be made directly or indirectly from the flyer requesting access to the flyer providing access. Indirect payment occurs when the flyer requesting access provides payment directly to the operator of the lounge management system 10, which then provides payment directly to the flyer providing access. For example, the flyer requesting access pays the operator of the lounge management system 10 (e.g. $27) and then the operator rewards/compensates the flyer providing access with cash, points (e.g., maintained by the lounge management system 10) or miles/points. Direct payment occurs when the flyer requesting access provides payment directly to the flyer providing access.

In some instances, the operator of the lounge management system takes a portion of the payment as a fee. With indirect payment, the fee is subtracted from the payment received directly from the flyer requesting access and the balance is provided to the flyer providing access (e.g., in the way of cash, points, miles, etc.). With direct payment, the fee is collected before or after the direct payment between the two flyers (e.g., from the flyer requesting access and/or from the flyer receiving access). For example, the fee can be collected as part of a subscription fee before or after the direct payment. As another example, the fee can be collected as part of a connection fee after the direct payment.

The transfer between the flyer requesting access and the flyer providing access can be accomplished by a payment module 56 of the application server 14. For example, the payment module 56 can request payment information, such as credit card information, from the requesting flyer by way of the airport lounge application 22. Alternatively, payment information stored in the user section 32 of the database 20 can be retrieved and used to complete the transaction. Alternatively, points maintained by the system 10 in the user section 32 of the database 20 can be transferred between the flyers. The payment module 56 can be further employed to collect the fee (e.g., a subscription fee or a connection fee).

With payment processed, a meeting between the flyers is confirmed through manual input from the flyers. The manual input is provided to the inventory management module 44 by way of the airport lounge application 22. Further, a meeting point is determined between the two flyers. The meeting point is determined using the tracking module 48, which tracks the locations of the two flyers. The tracking module 48 can use local data (e.g., WiFi, Bluetooth, iBeacons, global positioning system (GPS), sound, etc.) collected by the airport lounge application 22 to track the two flyers. For each of the flyers, proximity to the meeting point and the other person are continuously determined with the tracking system 48. The determined locations are then displayed using the airport lounge application 22, typically overlaid on a map of the airport, to allow the flyers to easily locate each other. Additionally or alternatively, an approximate distance, or other metric, describing the proximity of the two flyers to each other is displayed. Hence, as both flyers move closer to the meeting point, the proximity can be displayed. Delays or changes may be communicated by way of the airport lounge application 22.

Once at the meeting point, the requesting flyer is provided access to the lounge by way of the providing flyer. Further, both flyers typically rate the experience through the airport lounge application 22. Multiple aspects may be rated: general experience, the other person, and the process itself. The rating data for the other person can be associated with the record for the user in the users section 32 of the database 20. This data can then be used in determining, for example, calculated prices, access rules, etc.

Figure 3:
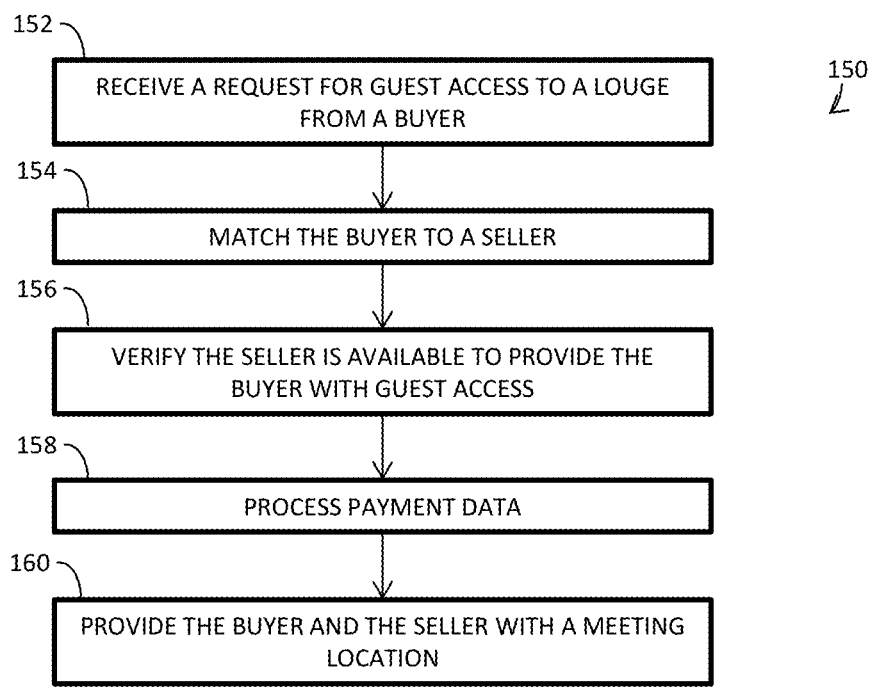
FIG. 3 illustrates a method for performing a peer-to-peer transaction according to one embodiment of the subject application.

With reference to FIG. 3, a method 150 for performing a peer-to-peer transaction is provided. The method 150 summarizes the foregoing discussion and is suitably performed by the inventory management module 44. According to the method, 150 a request for guest access to a lounge is received 152 from a buyer. As noted above, the buyer learns of the opportunity for guest access by way of a search for accessible lounges. In response to the request, the buyer is matched 154 with a seller and the availability of the seller to provide the buyer with access is verified 156. For example, a request for guest access is sent to the matched seller and, assuming the seller accepts, an acceptance response is received from the seller. Payment data is then processed 158 and a meeting location provided 160 is provided to both the seller and the buyer. The seller then provides the buyer with access to the lounge.

Referring back to FIG. 1, in some instances, the inventory management module 44 determines the suitability of the current lounge for a specific flyer attempting to enter. Other lounges may be more suitable based on proximity to gate, current lounge capacity, amenities (or available amenities—e.g., if the spa services are booked in one lounge, another lounge may have open slots), expected future capacity (e.g., multiple future departures near current lounge), cleaning schedules (e.g., may want the lounge empty to make it easier to clean), or closing time. If another lounge is determined more suitably, the cost (if any) required to change lounges is determined, typically through cooperation with the price calculator module 34, and the flyer is presented with an offer (similar to an upsell offer). In some instances, there may be multiple lounges more suitable. In this instance, the more suitable lounges may be ranked and presented to the flyer based on available capacity, proximity to gate, operating hours, the lounge providers ranked preference, and requested amenities.

For example, the entrant may wish to enter a regular lounge. However, it may be determined that another lounge may be more suitable because a large influx of flyers is expected shortly. The inventory management module 44 may offer an attractive 'upgrade' price to the first class lounge in order to make additional space available in the regular lounge. As another example, suppose there are two DELTA lounges in a specific terminal. If a flyer attempts to enter one of the lounges, it may be determined that the other lounge is more suitable for the passenger since there is more space and it is closer to the passengers gate. The flyer will then be notified of this.

As with upsell offers, this offer can be visually presented to a flyer by way of the airport lounge application 22 over the communications network 16. Other means of communicating with the flyer can also be employed, such as email, push notifications, or SMS. Alternatively, instead of directly communicating with the flyer, the offer can be communicated to an agent, such as a check-in agent, at the lounge where the flyer is attempting to enter and the agent can notify the flyer of the offer. Communication with the agent can be performed through the portal 50 or cooperation with a computing system local to the lounge. Other means of communicating with the agent, such as email, are also contemplated. There may be a cost associated with changing lounges, which can be processed from the current lounge (to allow for the passenger to easily enter the alternate lounge). Alternatively, the processing can be accomplished from the airport lounge application 44 through coordination with the payment module 56.

With continued reference to FIG. 1, the tracking module 48 tracks the location of flyers, typically using local data collected from the client devices 12 by way of the airport lounge application 22. The local data can include location data based on, for example, WiFi, Bluetooth (e.g., through iBeacons), GPS, sound, etc. Fixed 'beacons' may be used in conjunction with the client devices 12, which are non-fixed, to determine the location of the client devices 12. Using the local data, the location of the flyers is determined in an environment (e.g., an airport environment) through, for example, triangulation, trilateration, multilateration, or another technique for determining the location of a point relative to other points.

WiFi data can be used to track a flyer in instances where the WiFi basic service set identifier (BSSID)/media access control (MAC) address (or combination of these) of the current network the flyer is connected to are known (e.g., stored in the database 20). The tracking module 48 can check for the flyer's current WiFi network, or nearby WiFi networks, to determine if it is nearby a specific lounge's WiFi network which would provide a basic indicator of location.

As discussed above, the tracking module 48 can be used to determine proximity between two or more devices. This can be used to allow multiple devices to determine location in space (e.g., to facilitate interaction between devices, or device owners). For example, this can be used to facilitate connection between flyers during peer to peer transactions. Further, this can be used for connecting two people, or connecting flyers to the front desk, bar, TV, etc. Even more, this may be used to present content to flyers by way of the airport lounge application based on the proximity to another device/person/location/attraction.

With continued reference to FIG. 1, in some instances, the inventory management module 44 can cooperate with the tracking module 48 to identify popular areas from historical data regarding the locations of the flyers, and this historical data may be used to extrapolate hotspots for future parts of the day. The inventory management module 44 can, for example, use the extrapolated hotspots to manage the inventory. Notably, the tracking module 48 can track the flyers beyond lounges. For example, a flyer can be tracked through the entire airport, a theme park, a shopping mall, or anywhere else the flyer may be. Further, management personnel can view where their customers (i.e., flyers) are in real time through the portal 50. Customers may be displayed individually, or through a heat map. This data may be in real time or an aggregate for a longer time period (e.g., today so far, 1 hour, 1 day, 1 week, etc.).

In some instances, the inventory management module 44 through cooperation with the tracking module 48 determines hot (e.g., busy, in need or clearing) and cold (e.g., available space) regions in the lounge. Flyers in hot regions can then be presented with opportunities (e.g., upsell opportunities) in colder regions in order to shift/move users into the colder regions. Opportunities may be in the form of information, or special offers/deals. In other words, specific 'rewards' for less popular spaces are presented to flyers. For example, a flyer can be shown a deal at the bar to clear up lounge seating. In this way, flyers are presented with deals/offers/ information about alternative attractions to intelligently move people around to free up (or even out) space.

A flyer can be visually notified of an opportunity by way of the airport lounge application 44 over the communications network 16. Further, a flyer can be provided with a layout of the lounge to show the user the available seats/ areas (similar to available parking spaces in a smart parking garage). Other means of communicating with the flyer can also be employed, such as email, push notifications, or short message service (SMS). Alternatively, instead of directly communicating with the flyer, the opportunity can be communicated to an agent, such as a check-in agent, at the lounge where the flyer is located and the agent can notify the flyer of the offer. Communication with the agent can be performed through the portal 50 or cooperation with a computing system local to the lounge. Other means of communicating with the agent, such as email, are also contemplated.

In some instances, a community module 58 of the application server 14 allows flyers to vote for content (e.g., TV, music, etc.) in lounges. For example, flyers at a lounge can vote for content at the lounge. Flyers can vote by way of the airport lounge application 22. The external input (i.e., community 'voting') is passed to the inventory management module 44, which intelligently weighs the votes to determine the optimal change in content, temperature, food, service offerings. More valuable (e.g., member rating, status, customer value, location, etc.) flyers can have a greater weight in the voting. Management personnel are then notified of the changes to the lounges most sought after by the flyers. Alternatively, the changes are automatically made. The management personnel can be notified through the portal 50 or cooperation with a computing system local to the lounge. Other means of communicating with the management personnel, such as email, are also contemplated.

In some instances, the community module 58 allows the collection crowd sourced data (e.g., how busy a lounge is, etc.). This data can be collected by way of the airport lounge application 22 using pre-determined survey-type questions. In some instances, survey questions can be presented to flyers in response to checking in or checkout of airport lounges. The survey data can then be used by other modules 18 of the application server 14, such as the inventory module 44 or the tracking module 48, to determine certain information regarding a lounge. This community data may supplement other collected data (e.g., from sensors, research, etc.). This may be used for temperature regulation, determining at what point a space is considered 'busy' or 'empty', why people select specific lounges, etc. Data collected may be adjusted to account for outliers.

The community module 58 can further collect feedback data from flyers and analyze sentiment for certain aspects of the system 10 (e.g., the application, the lounge, the transaction, etc.). This data can be collected by way of the airport lounge application 22. Sentiment is based on user input, words in feedback/review/comment, time spent on actions, past sentiment, etc. The results could be used to determine a person's 'liking' of the product and allow actions based upon that (e.g., rating on the app store, providing feedback, etc.). Further, the results could be used for assessing any action. For example, the results could assess a transaction between flyers (i.e., a peer to peer transaction) to determine whether the flyers had a good experience, or whether the flyers are currently having trouble finding the other person for a peer to peer transaction.

In some instances, a notification module 60 of the application server 14 cooperates with the tracking module 48 to provide notifications regarding nearby airports to flyers with intent to visit the airport. For example, the tracking module 48 receives local data (e.g., WiFi data, Bluetooth data, etc.) from the airport lounge application 22 and determines the location of the flyer. The intent refers to an inference of the flyer's future actions. This inference may account whether upcoming trips are known and whether flyers travel nearby daily/weekly without visiting the airport.

Figure 5:
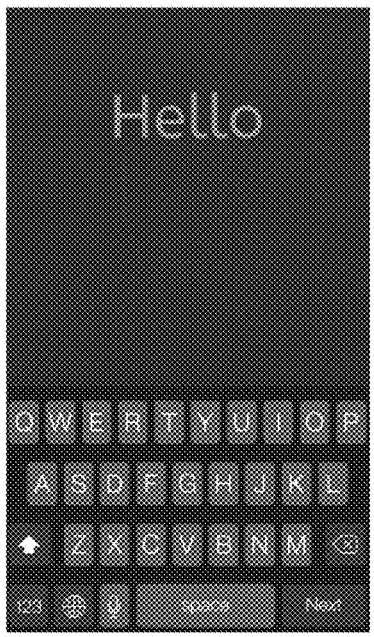
Figure 6:
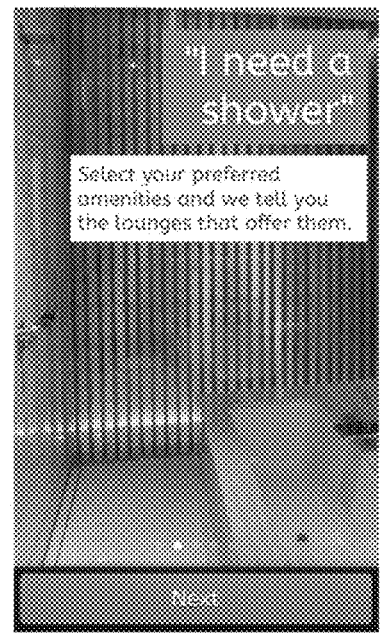
Figure 7:
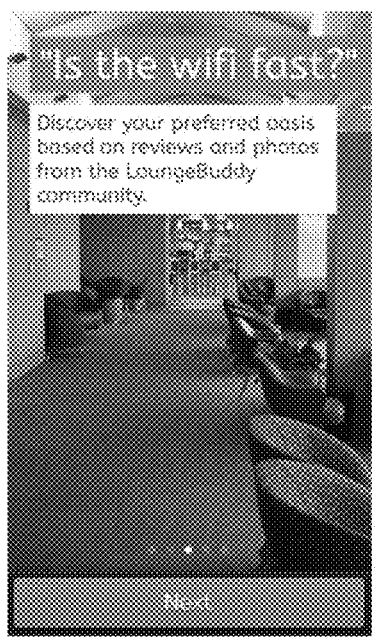
Figure 8:

With reference to FIGS. 4-48 and 53, an example of the airport lounge application 22/GUI is provided. Referring to FIG. 4, when the application 22 is first initialized by a flyer on the flyer's client device 12, the flyer is greeted and prompted to enter the flyer's name. Once the name is entered, the flyer selects a next button and proceeds to an introduction to the application 22. FIGS. 5-7 illustrate the different pages of the introduction. The flyer traverses through the pages by selecting a next button. Once the introduction is complete, the flyer is presented with a home page, as shown at FIG. 8. When the application is subsequently initialized, the flyer is first presented with the home page as opposed to the greeting and introduction pages.

Figure 9:
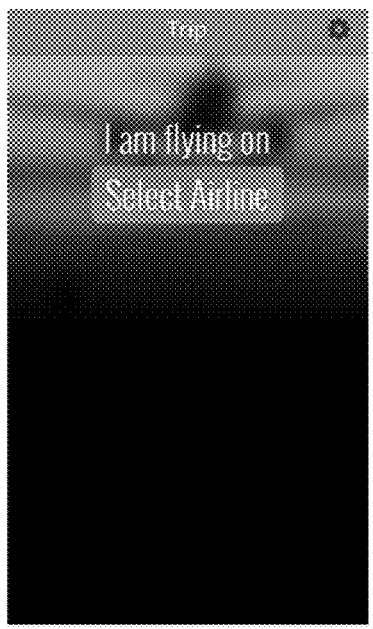
Figure 10:
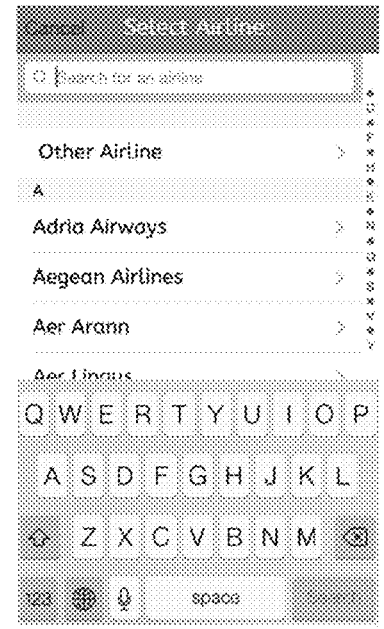
Figure 11:
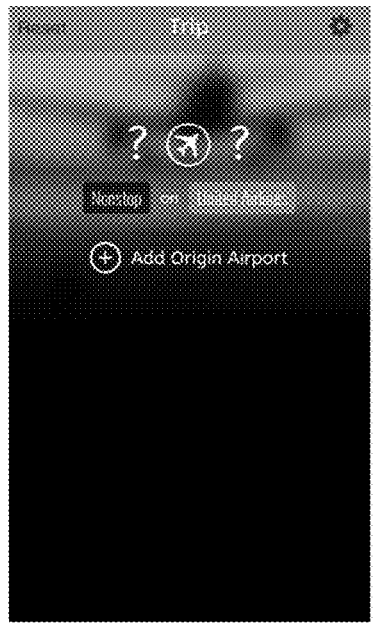

At the home page, the flyer can select an airline button to select an airline. FIG. 9 illustrates a page used to select an airline and displayed in response to selecting the airline button. After selecting an airline from the list of the airline page, the user is returned to the home page, as illustrated in FIG. 10. In contrast with the empty home page of FIG. 8, the home page of FIG. 10 now indicates the airline. The home page can be reset to FIG. 8 by selecting the reset button. The user can also change the airline by selecting the button labeled with the selected airline name (in this case UNITED AIRLINES). The user further has the option to add an origin airport by way of an origin airport button. By selecting the origin airport button, the flyer is presented with the airport selection page shown in FIG. 11. The airport selection page lists available airports.

Figure 12:
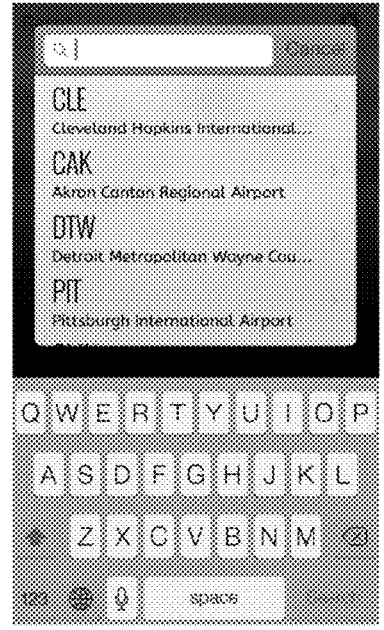
Figure 13:
Figure 14:
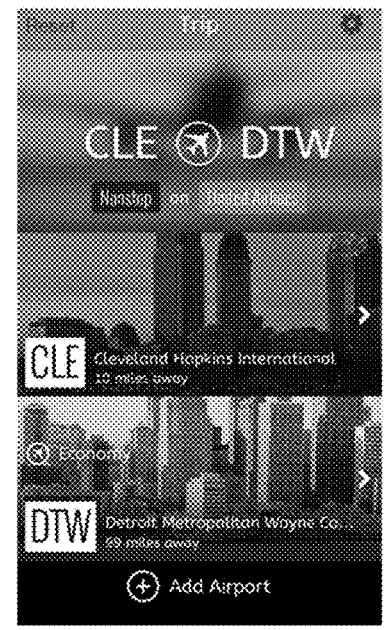
Figure 15:
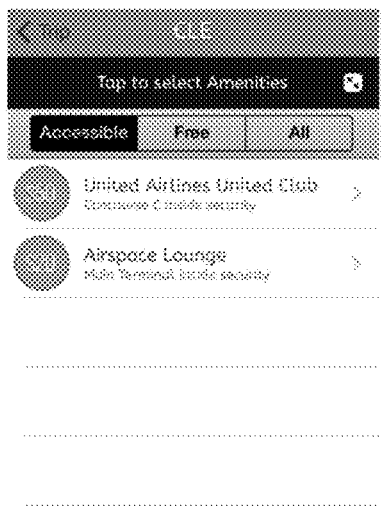
Figure 16:
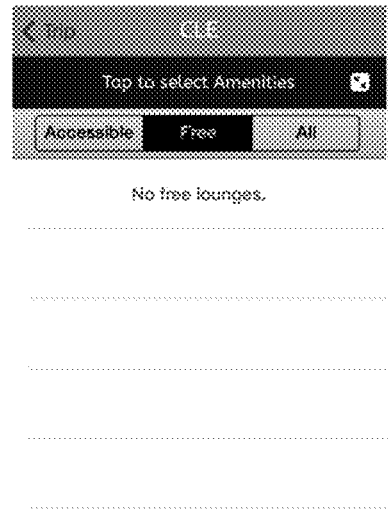
Figure 17:
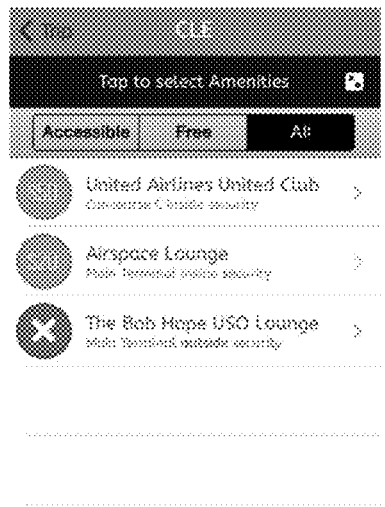

After selecting an airport, the flyer is returned to the home page shown in FIG. 12, which now further lists the selected airport. The flyer then has the option of selecting a destination airport and a connection airport using the airport selection page of FIG. 11. Selecting additional airports updates the home page with the selected additional airports, as shown in FIG. 13, where a destination airport has been added. At the home page, the flyer can select one of the one or more listed airports to see a listing of airport lounges accessible to the user, as shown in FIGS. 14-16. As discussed above, each list item corresponds to a lounge and a set of one or more access rules allowing the flyer to access the lounge. The list can be filtered or sorted based on cost (e.g., free, accessible, and all). Further, the list can be filtered based on amenities through selection of a filter button. FIG. 17 illustrates a filter page allowing a flyer to select amenities to filter the list with.

Figure 20:
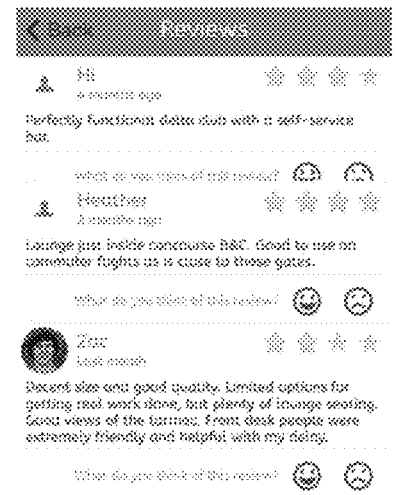
Figure 21:
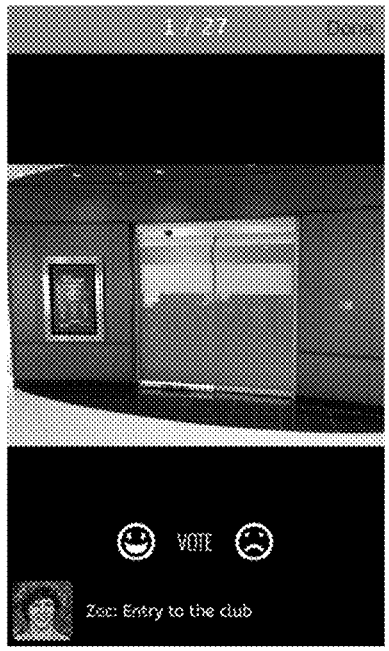

To assess a lounge, a flyer can select a lounge in the listing to display a lounge page, as illustrated in FIG. 18. The lounge page shows pictures, reviews, ratings, and other information regarding the lounge (e.g., amenities). Further information regarding reviews can be shown in detail on a review page, as illustrated in FIG. 19, by selecting the review section. Further pictures can be shown on a picture page, as illustrated in FIG. 20, by selecting the picture section. The lounge page can be shared with friends by selecting a share button, as illustrated in FIG. 21.

Figure 22:
Figure 26:
Figure 27:
Figure 28:
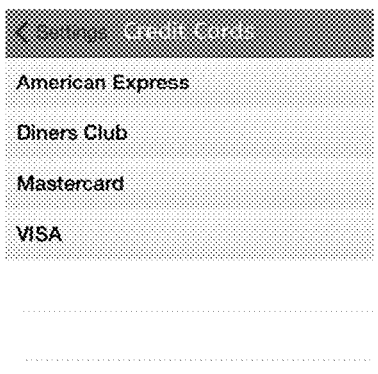
Figure 29:
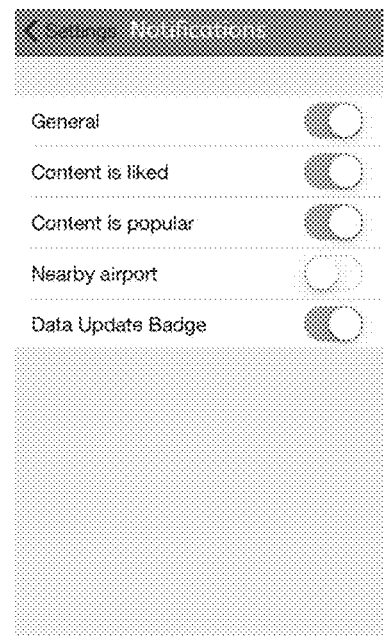
Figure 30:
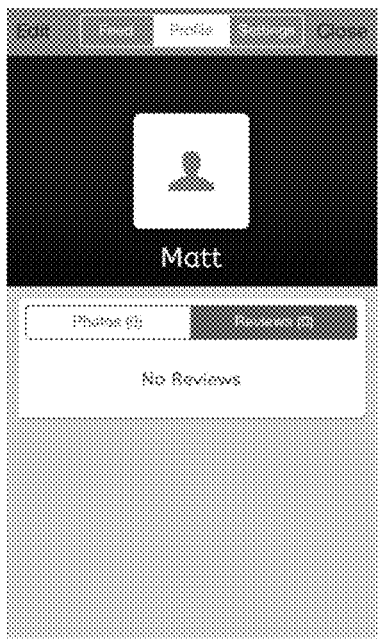
Figure 31:
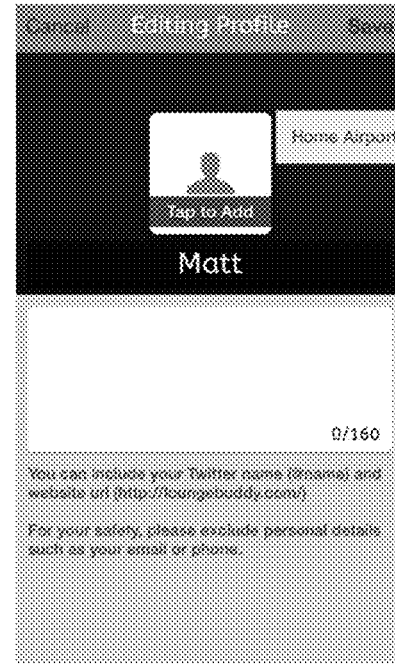

At the home page, an example of which is shown in FIG. 8, the flyer can enter account data and access items by selecting a user preferences button (illustrated by a gear icon). FIG. 22 illustrates a user preferences page. At a settings section of the user preferences page, the user can change general settings by selection of a general button, which redirects the flyer to a general settings page, as shown in FIG. 23. The user can further change social settings (for sharing) by selection of a social button, which redirects the flyer to a social settings page, an example of which is shown in FIG. 24. Even more, a user can change settings for access methods, such as elite status, lounge memberships, credit cards, U.S. military memberships through selection of corresponding buttons or toggles. Selection of one these buttons displays a corresponding page, as shown in FIGS. 25-27. The user can further define events for which notifications are sought by selecting a notification button to access a notification page, as shown in FIG. 28. Also at the user preferences page, the flyer can edit a profile and view a news feed through selection of buttons to access corresponding sections of the user preference page. Regarding the profile section, an example is illustrated in FIGS. 29 and 30. Regarding the feed section, an example is illustrated in FIG. 31.

Figure 32:
Figure 33:
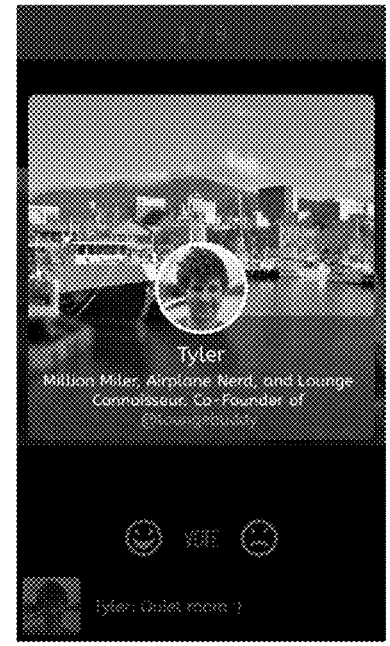

FIGS. 32-48 and 53 Illustrate additional examples of the airport lounge application 22/GUI. FIG. 32 illustrates a user profile upon selection of a username of a member of the lounge management system 10. FIG. 33 illustrates a home screen displayed upon initiating the airport lounge application 10. The user can either create a trip by entering their itinerary (in the same or a similar manner as discussed above) or the user can view lounges at the airport to which they're manually or automatically localized to. The former is slower, but provides a better experience, whereas the latter is faster.

Figure 34:
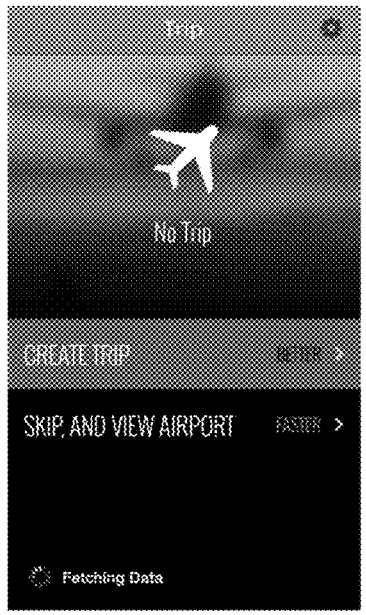
Figure 35:
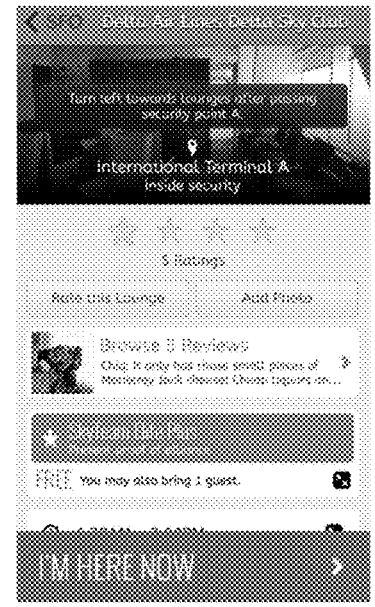
Figure 36:
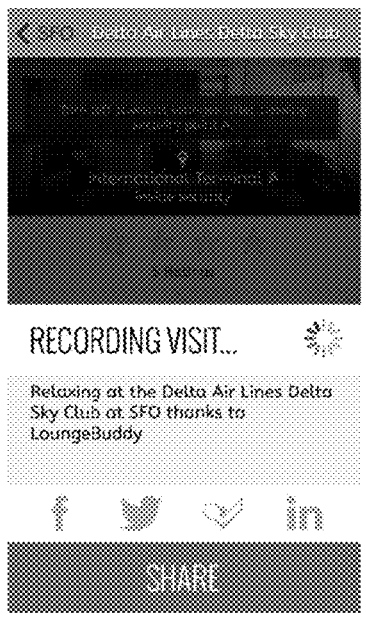

FIG. 34-36 illustrate a manual check-in to an airport lounge. FIG. 34 illustrates a lounge page describing details of the lounge. The lounge page is similar to the lounge page shown in FIG. 18. However, because the user has purchased or otherwise acquired access to the lounge, the user is further presented with an "I'M HERE NOW" button that the user can select to check in. After selecting the button, the user is checked in and prompted to share their visit to the lounge on a social network, such as FACEBOOK, LINKEDIN, TWITTER, OR FOURSQUARE. An example of this prompt is shown in FIG. 35. Selecting a social network in the prompt then shares the visit on the social network if the user has linked their account to the lounge management system 10. Otherwise the user is prompted to link their account, an example of which is shown in FIG. 36.

Figure 37:
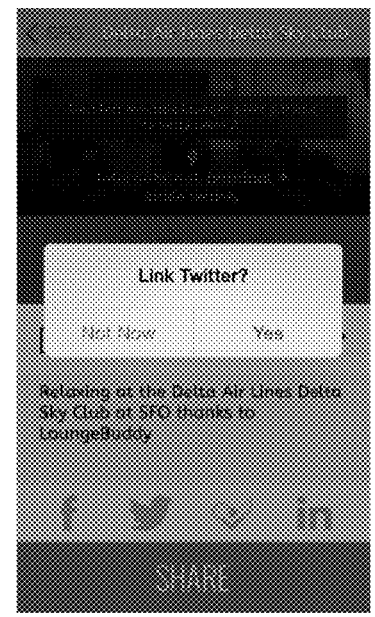
Figure 38:
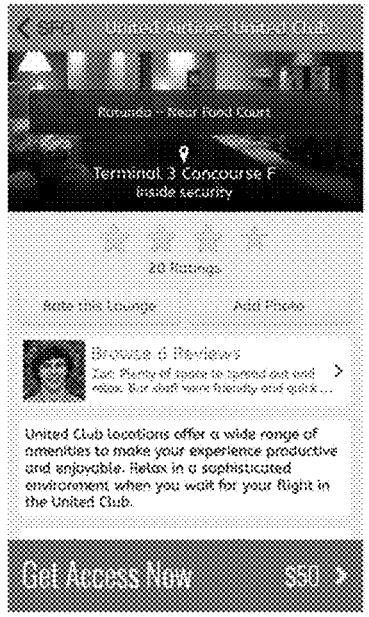
Figure 39:
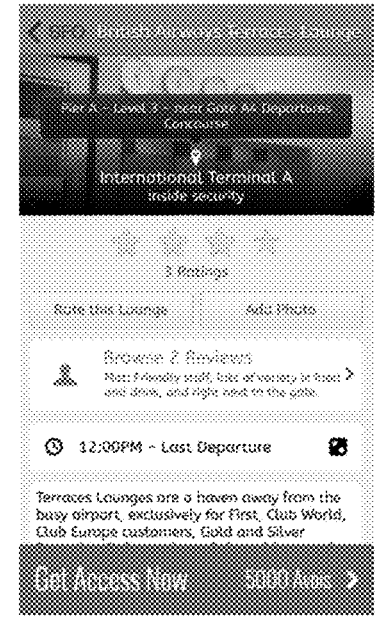
Figure 40:
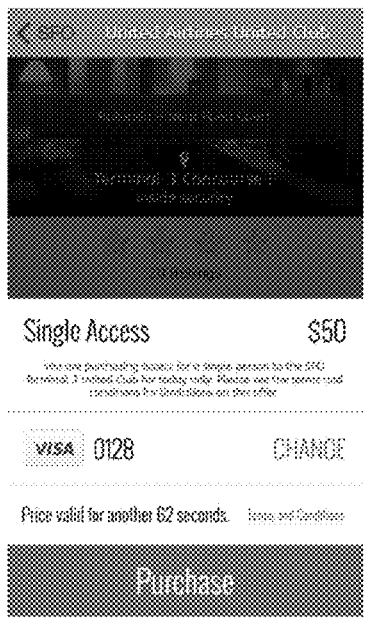

FIG. 37 illustrates a lounge page with the option to purchase access to the lounge with U.S. dollars. More specifically, FIG. 37 illustrates a button allowing the user to purchase access to the lounge for $50. FIG. 38 similarly illustrates a lounge page with the option to purchase access to the lounge. However, in contrast with FIG. 37, which allows the purchase of access with U.S. dollars, FIG. 38 allows the purchase of access with points (e.g., 5000 Avois or points). FIGS. 39 and 40 illustrate payment for lounge access. FIG. 39 provides an example of a payment page displayed upon selection of the "Get Access Now" button of FIG. 37. Therein, the user can select a payment method, optionally from a list of pre-associated payment instruments (e.g., credit cards). Further, the user can confirm the purchase price and submit payment. FIG. 40 illustrates a payment-complete page displayed upon submitting payment.

Figure 41:
Figure 42:
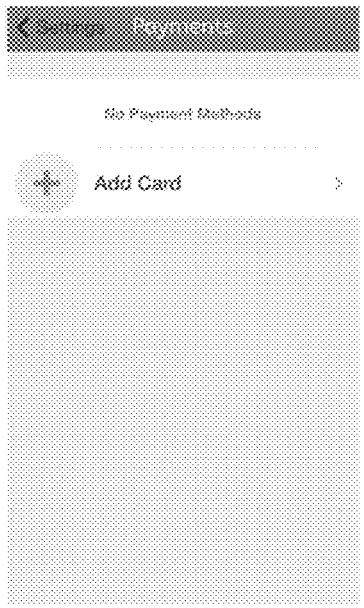
Figure 43:
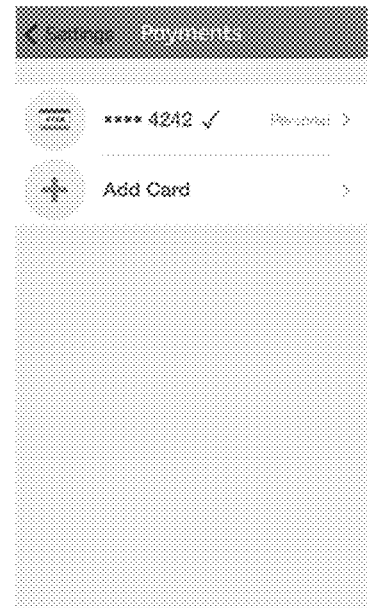
Figure 44:
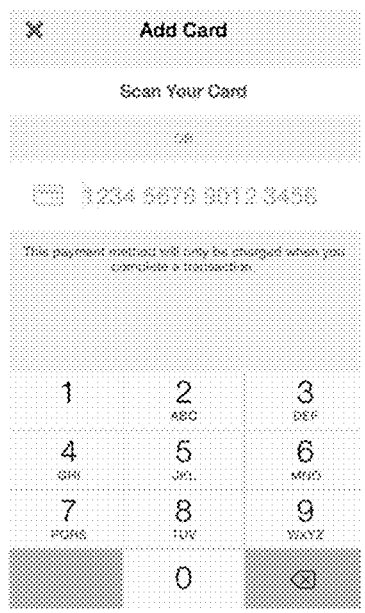

FIGS. 41-44 illustrate displayed pages to associate payment instructions with an account of the lounge management system 10. FIG. 41 illustrates a payments page in settings that lists associated payment instruments and allows the association of additional payment instruments. As illustrated, there are no associated payment instruments. FIG. 42 illustrates the payments page with an associated credit card. FIG. 43 illustrates an association page for associating a credit card. The association page is displayed in response to selecting the "Add Card" button of FIGS. 41 and 42. FIG. 44 illustrates a payment instrument page displayed in response to selecting an associated payment instruction listed on the payments page. Identifying information of the payment instrument is displayed. For example, the last four digits of the credit card are displayed. Further, the user can selectively delete the payment instrument and/or classify the payment instrument (e.g., for personal, business or other use).

Figure 45:
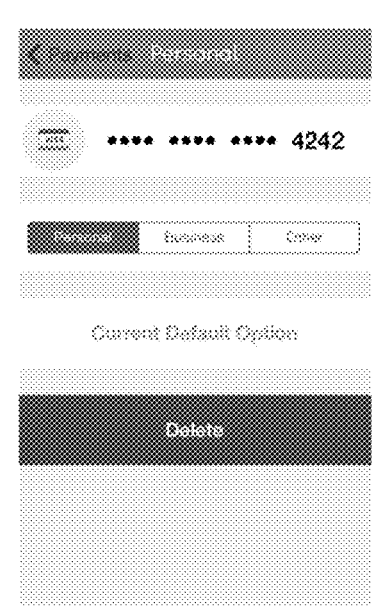

FIG. 45 illustrates an advertisement page displayed to a user. The advertisement can be targeted to specific groups of people, such as people on a certain flight number, on a certain route, on a certain airline, with a certain class of service (e.g., first class), within or from a certain country, any combination of the foregoing, or multiple combinations of the foregoing. The relevant data to target the advertisement can be collected from, for example, the profile data of users of the lounge management system 10. Further, targeted advertisements can be identified in response to events, such as timer events or the acquisition of additional user data.

Figure 46:
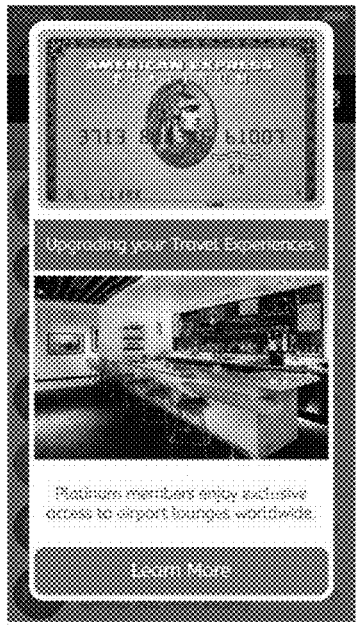
Figure 47:
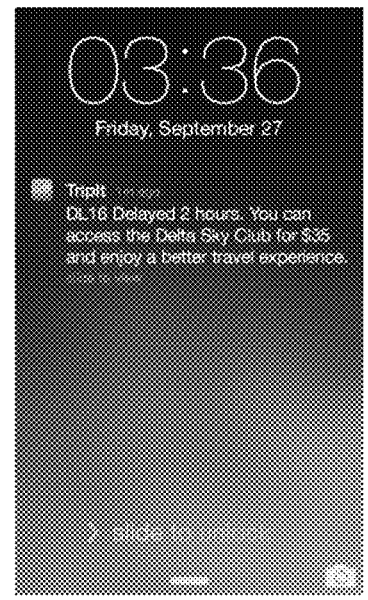
Figure 48:
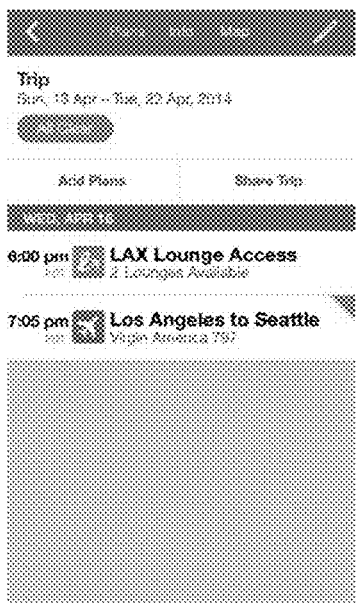

FIGS. 46-48 illustrate integration of external services with the lounge management system 10. FIG. 46 illustrates a push notification to a user of the lounge management system 10, as well as pushing data collected from an external service, such as TRIPIT. Push notifications are displayed to users on display devices of corresponding client devices 12. The push notifications can, for example, notify the users of travel delays and/or potential lounges available to the user. FIGS. 47 and 48 illustrate how a third party service might integrate/incorporate the lounge management system 10 into the third party service. FIG. 47 illustrates the integration of the lounge management system 10 by listing a lounge reservation with a reserved flight. FIG. 48 illustrates the integration of the lounge management system 10 by allowing lounge information to be viewed and reservations to be made within a third party service.

FIGS. 49-52 illustrate a GUI of the management portal 50. The GUI can be displayed on the management device 52 to management personnel working a lounge.

Figure 49:

FIG. 49 illustrates the management portal 50/GUI used with/displayed on the management device 50. Management personnel can change the availability of times to access the lounge, or turn off access completely. Further, management personnel can one or more of: modify the price (for now, or any time period); see the people who are expected to be in the lounge soon (e.g., just purchased access, based on their flight, or past actions) with details about the passenger (e.g., flight details, loyalty information, location information (e.g., they are in this room) etc.); and see statistics about the lounge (at least some of which may be projected into the future taking into account past data).

Figure 50:
FIGS. 50-53 illustrate an example management application/GUI according to one embodiment of the subject application.

FIG. 50 illustrates the management portal 50/GUI when admitting a user who has already purchased access, after management personnel have scanned the users boarding pass, or before, during, or after any other entry method.

Figure 51:
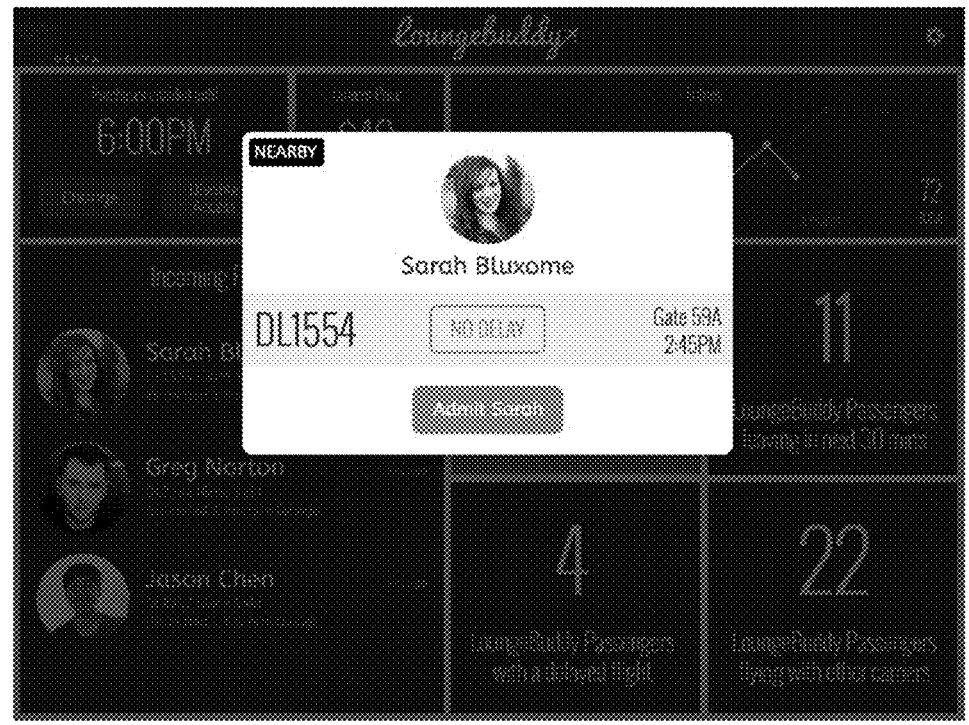

FIG. 51 illustrates branding of the management portal 50/GUI to a specific operator of a lounge. More specifically, FIG. 51 illustrates branding of the management portal 50/GUI of FIG. 49 to Emirates.

Figure 52:

FIG. 52 illustrates an upsell opportunity that management personnel can present to a user of the lounge or a user attempting to enter the lounge. The upsell may attempt to upsell people to a different lounge, or on services within the lounge (e.g., access to a spa, a shower, a conference room, etc.). Suggestions will be made based on historical data for the lounge, individual passenger, or passenger type. Payment is made easy if the user has used the system in the past, since the system can remember their payment details to process this payment. This ensures a frictionless experience.

Figure 53:
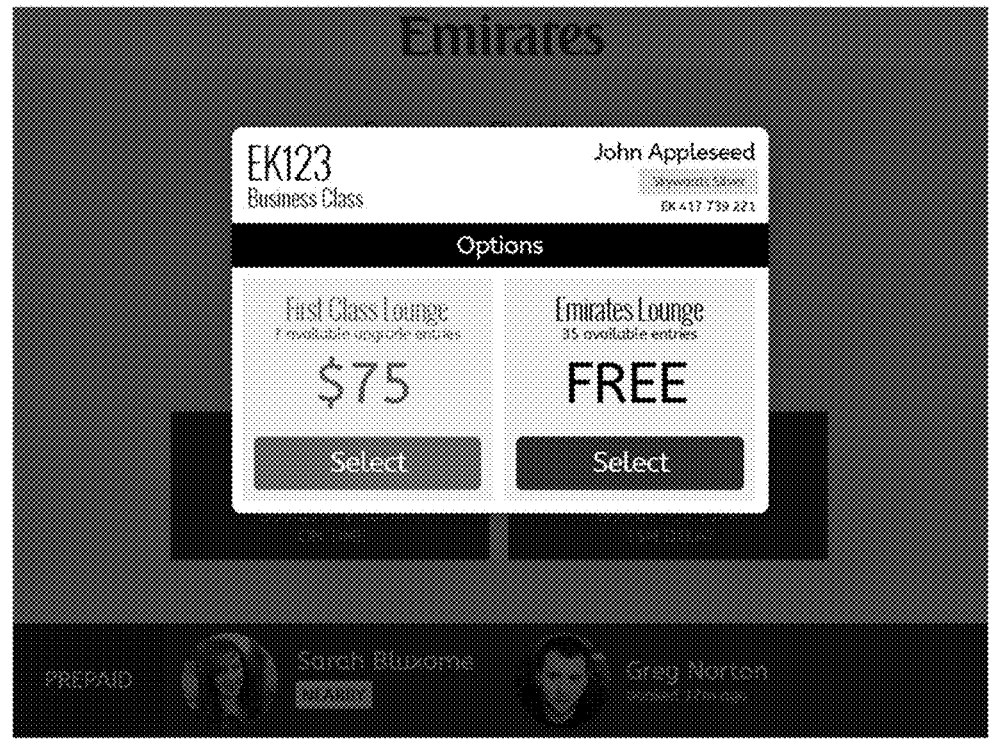

FIG. 53 illustrates a profile feed that can be included as part of the feed of FIG. 31.

Figure 54:
Figure 55:
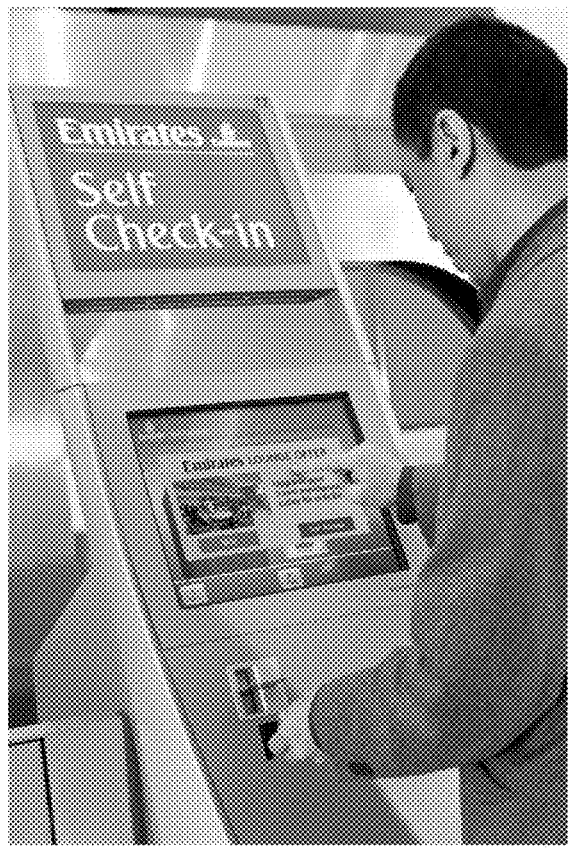
FIG. 55 illustrates a self-check-in kiosk for a lounge according to one embodiment of the subject application.

FIG. 54 illustrates a self-check-in kiosk of a lounge or a self-check-in kiosk of an airline integrating with the lounge management system 10. As to the former, flyers may check-in to a kiosk of the lounge. As to the latter, flyers can check-in for a flight. The kiosk can optionally display upsell opportunities and/or advertisements to the user.

Figure 56:
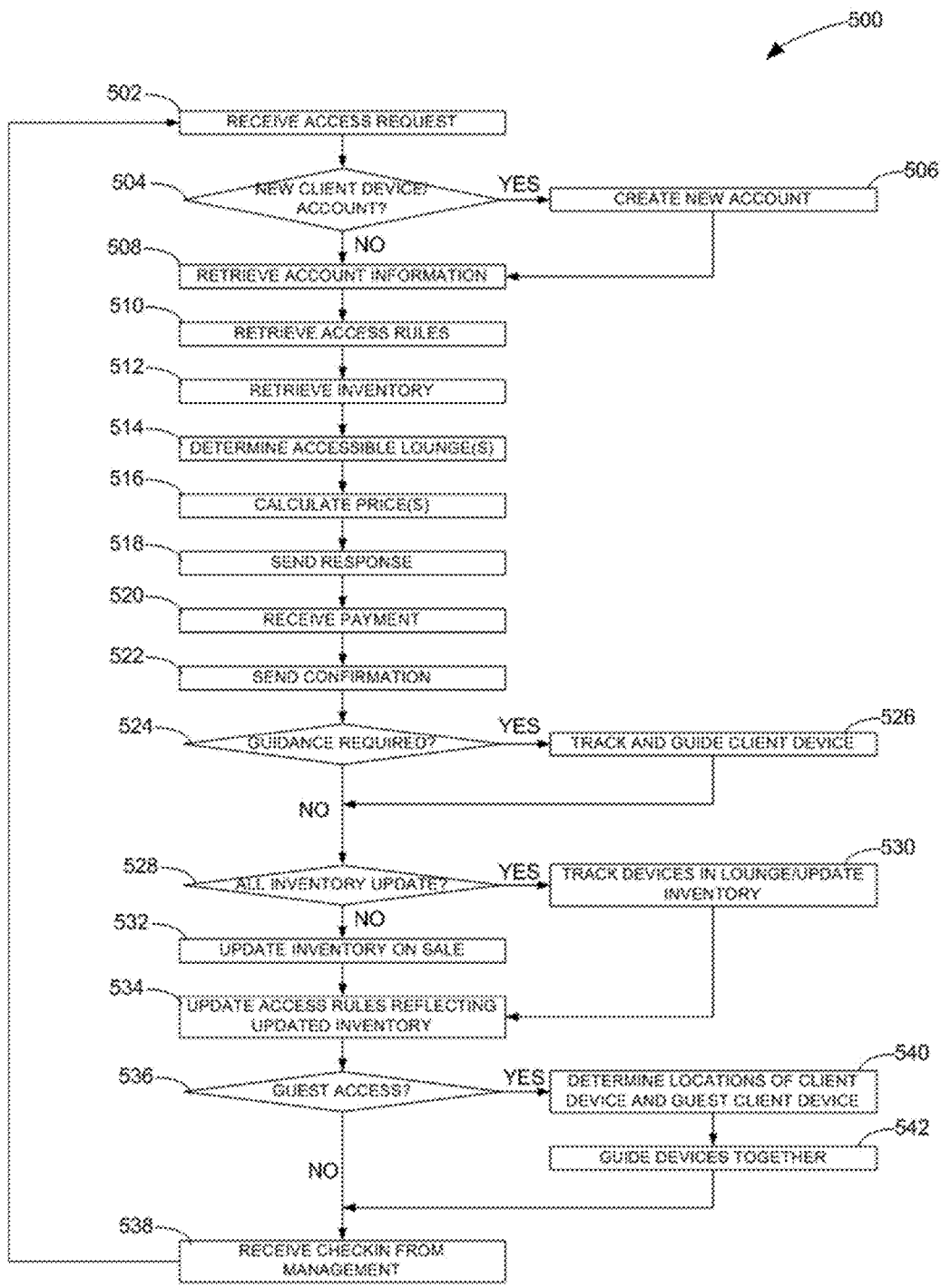
FIG. 56 illustrates a flowchart depicting an example implementation of the method for managing and providing access to airport lounges in accordance with the systems and methods illustrated and discussed in FIGS. 1-55.

Turning now to FIG. 56, there is shown a flowchart 500 depicting one example method for managing and providing access to an airport lounge according to an embodiment of the subject application. Beginning at 502, the application server 14 receives an access request from an airport lounge application 22 resident on a client device 12, the access request includes at least one access item. At 504, the application server 14 determines whether the access request from the client device 12 indicates a known user (existing account). Upon a negative determination, operations proceed to 506, whereupon a new user account is created (as discussed in greater detail above). After account creation, or upon a determination at 504 that there is an existing account associated with the access request, operations progress to 508.

At 508, the application server 14 retrieves the account information, including any known access items stored in association with the user account from the database 20. At 510, the application server 14 queries the database 20 to retrieve access rules 30 corresponding to those lounges 28 associated with the airport or location specified or associated with the access request. In one embodiment, the access request includes a flight number or TRIPIT identification, whereupon the application server 14 is capable of retrieving the airport information for each segment/flight corresponding thereto. At 512, the application server 14, via the inventory management module 44 or other suitable component, retrieves an inventory 46 of each lounge 28.

The application server 14 then determines, at 514, the airport lounges 28 that are accessible based upon the access item, access rules 30 and the inventory 46. A price, if required, is then calculated for access to the lounge at 516 based upon the access rules 30 and inventory 46. A response is then communicated, at 518, to the requesting client device 12 based upon the accessibility determination. At 520, payment is received from the client device 12 for access to one of the accessible lounges 28.

At 522, confirmation information is sent by the application server 14 to the client device 12 to enable access to the lounge 28. A determination is then made at 524 whether guidance from the current location of the client device 12 to the lounge 28 is required. Upon a positive determination, operations proceed to 526, whereupon the application server 14, via tracking module 48, facilitates the guidance and routing of the client device 12 to the lounge. After guidance at 526, or upon a determination at 524 that no guidance is necessary, operations progress to 528.

A determination is made at 528 whether the inventory 46 of the lounge 28 requires complete updating (all clients 12) or a single update based on the most recent transaction. For example, if the inventory 46 has not been updated within a predetermined timeframe, the tracking module 48 identifies those client devices 12 present in the lounge 28, as well as queries the management device 52 at 530. Otherwise, at 532, the inventory 46 is updated by the application server 14 to reflect the most recent transaction. At 534, the application server 14 updates the access rules 30 responsive to the change in inventory 46. It will be appreciated that the price to be charged by the price calculator 34 may be modified to reflect the change in access rules 30.

At 536, a determination is made whether a guest access request has been received from a client device 12. In the event that no guest access requests are received, operations proceed to 538, whereupon the application server 14 waits to receive check-in information from the management device 52 or a request for access (non-guest) from a client device 12 (at 502), whereupon the process repeats.

If a determination is made at 536 that guest access is requested (or purchased), the application server 14 identifies a suitable candidate (as described above) and determines, at 540, the respective locations of the candidate client device 12 and the guest client device 12. The application server 14 then directs each device 12 towards each other, tracking their respective progress and providing guidance as the devices 12 travel at 542. Operations then progress to 538 for check-in or return to 502 responsive to another access request.

It will be appreciated that the description of FIG. 56 is intended as one possible implementation of the application server 14, the airport lounge application 22, the management device 52, and the client device 12. Each of the components described above and illustrated in FIG. 1 may further function as described elsewhere in this application, and the explanation accompanying FIG. 56 is intended as an example and not a limitation thereof.

It is to be appreciated that while the system 10 was described in connection with airport lounges, the system 10 has broader applicability. For example, the system 10 can be used for hotels, lounges, etc. Moreover, while only a single application server 14 is shown, it is to be appreciated that multiple application servers can be employed with the modules 18 distributed across the application servers. Even more, it is to be appreciated that the modules 18 are merely abstractions for the functionality of the application server 14. The abstractions can be refined and reorganized without changing the system 10. Even more, functionality performed on the application server 14 can be performed on the client devices 12 and/or the management devices 52. Similarly, functionality performed on the client devices 12 and/or the management devices 52 can be performed on the application server 14. Also, the foregoing functionality can be integrated with other systems/platforms, such as TRIPIT AND CONCUR'S Expense Management system.

The methods and the systems described herein may be embodied by a computer, or other digital processing device, including a digital processor and including or having access to digital data storage. In some instances, the methods and the systems may be embodied by a server including a digital processor and including or having access to digital data storage. In these instances, the server can be accessed over the Internet or a local area network, typically by a smartphone or personal data assistant (PDA) including a digital processor and digital data storage.

The computer or other digital processing device suitably includes or is operatively connected with one or more user input devices for receiving user input, and further includes, or is operatively connected with, one or more display devices. In some instances, the input for controlling a method or a system described herein is received from another program running previously to or concurrently with the method or the system on the computer or other digital processor device, or from a network, or so forth. Similarly, in some instances, the output of a method or a system described may serve as input to another program running subsequent to or concurrently with the method or the system on the computer, or may be transmitted via a network connection, or so forth.

In some instances, the methods described herein are embodied by a storage medium storing instructions executable (e.g., by a digital processor) to implement the methods. The storage medium may include, for example: a magnetic disk or other magnetic storage medium; an optical disk or other optical storage medium; a random access memory (RAM), read-only memory (ROM), or other electronic memory device or chip or set of operatively interconnected chips; an Internet server from which the stored instructions may be retrieved via the Internet or a local area network; or so forth.

It is to further be appreciated that, in connection with the methods and the systems herein, certain structural and/or functional features are described as being incorporated in defined elements and/or components. However, it is contemplated that these features may, to the same or similar benefit, also likewise be incorporated in other elements and/or components where appropriate. It is also to be appreciated that different aspects of the methods and the systems described herein may be selectively employed as appropriate to achieve other alternate embodiments suited for desired applications, the other alternate embodiments thereby realizing the respective advantages of the aspects incorporated therein.

Even more, it is to be appreciated elements or components described herein may have their functionality implemented via hardware, software, firmware or a combination thereof. Additionally, it is to be appreciated that elements described herein as incorporated together may under suitable circumstances be stand-alone elements or otherwise divided. Similarly, functions described as being carried out by a particular element may be carried out by a plurality of distinct elements acting independently to carry out individual functions, or individual functions may be split-up and carried out by a plurality of distinct elements acting in concert. Alternately, some elements or components otherwise described and/or shown herein as distinct from one another may be physically or functionally combined where appropriate.

As used herein, a memory or digital data storage includes any device or system storing data, such as a random access memory (RAM) or a read-only memory (ROM). Further, as used herein, a digital processor includes any device or system processing input device to produce output data, such as a microprocessor, a microcontroller, a graphic processing unit (GPU), an application-specific integrated circuit (ASIC), a field-programmable gate array (FPGA), and the like; a controller includes any device or system controlling another device or system, and typically includes at least one processor; a user input device includes any device, such as a mouse or keyboard, allowing a user of the user input device to provide input to another device or system; and a display device includes any device for displaying data, such as a liquid crystal display (LCD) or a light emitting diode (LED) display.

The exemplary embodiment has been described with reference to the preferred embodiments. Obviously, modifications and alterations will occur to others upon reading and understanding the preceding detailed description. It is intended that the exemplary embodiment be construed as including all such modifications and alterations insofar as they come within the scope of the appended claims or the equivalents thereof.

What is claimed is:

1. A system for dynamically managing airport lounge inventory, comprising:
    an application server comprising:
        a processor;
        a database, the database comprising:
            a plurality of access rules corresponding to access to a corresponding plurality of associated airport lounges, and
            an inventory corresponding to an available capacity in each of the plurality of associated airport lounges; and
        memory in communication with the processor, the memory storing instructions which are executed by the processor for:
            receiving an access request from an associated airport lounge application resident on an associated client device;
            receiving at least one access item associated with the access request;
            retrieving the plurality of access rules from the database;
            determining whether at least one of the plurality of airport lounges is accessible for a user of the associated client device in accordance with the received access request and the at least one access item, and the retrieved access rules;
            communicating a response to the access request based upon the accessibility determination;
            tracking a location of each of a plurality of associated client devices within at least one of the plurality of airport lounges using local positioning data of the associated client device collected by the application server;
            updating the inventory associated with the at least one airport lounge responsive to the tracked locations; and
            dynamically updating the at least one set of access rules corresponding to the at least one airport lounge responsive to the updated inventory of the corresponding at least one associated airport lounge;
    wherein the memory further stores instructions which are executed by the processor for:
    determining, in accordance with the access rules and the at least one access item, a guest access status associated with the user of the associated client device;
    receiving, from the associated client device, instructions to transfer the quest access status to a second client device;
    determining relative positions of the associated client device and the second client device;
    generating routing information specific to each client device, the routing information corresponding to a route to a single physical location;

tracking each client device on route the single physical location; and updating the route specific to each client device during travel to the single physical location.

2. The system of claim 1, wherein the memory further stores instructions which are executed by the processor for:
calculating a price associated with access to the at least one airport lounge;
modifying the calculated price in accordance with the updated inventory associated with the at least one airport lounge.

3. The system of claim 1, wherein the memory further stores instructions which are executed by the processor for:
tracking a position of the associated client device relative to the location of the at least one airport lounge;
querying an external database for mapping information;
generating a route from the tracked position of the associated client device to the at least one airport lounge; and
communicating the generated route to the associated client device for display thereon.

4. The system of claim 1, wherein the associated client device transfers the guest access status to the second client device via at least one of the application server or a peer-to-peer communication link.

5. The system of claim 1, wherein the access item includes a flight number, the memory further storing instructions which are executed by the processor for:
retrieving, from a database associated with a flight provider, information relating to the flight number comprising at least one of an arrival time, a departure time, a gate location, or a boarding time;
identifying at least one of the plurality of associated airport lounges in accordance with a proximity thereof relative to the departure gate;
receiving, from the associated client device, location information corresponding to the physical location of the associated client device;
generating guidance directing the user of the associated client device to the at least one identified airport lounge from the received associated client device location information; and
communicating the generated guidance to the associated client device.

6. The system of claim 1, wherein the memory further stores instructions which are executed by the processor for:
comparing inventories of a plurality of accessible associated airport lounges,
determining an approximate time of entry into each of the plurality of accessible airport lounges;
identifying at least one of the plurality of accessible associated airport lounges with available inventory to client device responsive to the determined time of entry;
responsive to a request for access, determining position of client device; and
generating guidance from determined position to lounge requested.

7. The system of claim 1, wherein the response to the access request comprises a list of accessible lounges and at least one additional detail selected from the group consisting of a price for access, terminal location, gate proximity, name, available amenities, guest access, benefits, time allowed in lounge, guest cost, ease of entry, or airline association.

8. The system of claim 1, wherein the at least one access item is selected from the group consisting of elite status, lounge memberships, credit cards, frequent flyer program information, military status, day pass, bank accounts, flight segments, class of service, and flight number.

9. The system of claim 1, further comprising a management device associated with the at least one airport lounge, the management device comprising:
a processor,
memory in communication with the processor storing instructions, which are executable by the processor for:
establishing a first bidirectional communication link with each of a plurality of associated client devices of users present in the at least one airport lounge;
communicating an access request from the associated client device to the application server;
determining, in accordance with the bidirectional communication an inventory associated with the at least one airport lounge; and
communicating the determined inventory to the application server via a second bidirectional communication link separate from the first bidirectional communication link.

10. The system of claim 1, wherein the at least one access item is selected from the group consisting of elite status, lounge memberships, credit cards, frequent flyer program information, military status, day pass, bank accounts, flight segments, class of service, and flight number.

11. A method for dynamically managing airport lounge inventory, comprising:
receiving, at an application server having a processor and memory storing instructions executable by the processor, an access request from an associated airport lounge application resident on an associated client device, the access request including at least one access item;
retrieving, from a database in communication with the application server, a plurality of access rules corresponding to access to a corresponding plurality of associated airport lounges;
retrieving, from the database, an inventory corresponding to an available capacity in each of the plurality of associated airport lounges;
determining whether at least one of the plurality of airport lounges is accessible for a user of the associated client device in accordance with the retrieved access rules, the received access request, the corresponding inventory, and the at least one access item;
communicating a response to the access request based upon the accessibility determination;
tracking a location of each of a plurality of associated client devices within at least one of the plurality of airport lounges using local positioning data of the associated client device collected by the application server;
updating inventory associated with the at least one airport lounge responsive to the tracked location;
dynamically updating the at least one set of access rules corresponding to the at least one airport lounge responsive to the updated inventory of the corresponding at least one associated airport lounge;
wherein the method further comprises:
determining, in accordance with the access rules and the at least one access item, a guest access status associated with the user of the associated client device;
receiving, from the associated client device, instructions to transfer the guest access status to a second client device;
determining relative positions of the associated client device and the second client device;

generating routing information specific to each client device, the routing information corresponding to a route to a single physical location;
tracking each client device on route the single physical location; and
updating the route specific to each client device during travel to the single physical location.

12. The method of claim 11, further comprising:
calculating a price associated with access to the at least one airport lounge;
modifying the calculated price in accordance with the updated inventory associated with the at least one airport lounge.

13. The method of claim 11, wherein the access item includes a flight number, the method further comprising:
retrieving, from a database associated with a flight provider, information relating to the flight number comprising at least one of an arrival time, a departure time, a gate location, or a boarding time;
identifying at least one of the plurality of associated airport lounges in accordance with a proximity thereof relative to the departure gate;
receiving, from the associated client device, location information corresponding to the physical location of the associated client device;
generating guidance directing the user of the associated client device to the at least one identified airport lounge from the received associated client device location information; and
communicating the generated guidance to the associated client device.

14. The method of claim 11, further comprising:
comparing inventories of a plurality of accessible associated airport lounges,
determining an approximate time of entry into each of the plurality of accessible airport lounges;
identifying at least one of the plurality of accessible associated airport lounges with available inventory to client device responsive to the determined time of entry;
responsive to a request for access, determining position of client device; and
generating guidance from determined position to lounge requested.

15. The method of claim 11, further comprising:
tracking a position of the associated client device relative to the location of the at least one airport lounge;
querying an external database for mapping information;
generating a route from the tracked position of the associated client device to the at least one airport lounge; and
communicating the generated route to the associated client device for display thereon.

16. A computer-implemented method for requesting access to inventory of an airport lounge inventory, comprising:
requesting, via an airport lounge application resident on a client device having a processor and memory storing instructions executable by the processor, an available airport lounge, the request including at least one access item and a current location of the client device;
establishing a first communication link with an associated application server having a processor and memory storing instructions executable by the processor;
receiving, from the associated application server, a response to the access request, the response comprising access details corresponding to access to the at least one airport lounge;
retrieving a plurality of access rules for the at least one airport lounge from a database of the associated application server;
receiving from the associated application server confirmation information relating to access to the at least one airport lounge based on the at least one access item, the current location of the client device, and the retrieved access rules;
establishing a second communication link with an associated client management device located in association with the at least one airport lounge, the second communication link distinct from the first communication link;
communicating, via the second communication link, the confirmation information associated with access to the at least one airport lounge;
tracking a location of each of a plurality of associated client devices within at least one of the plurality of airport lounges;
updating inventory associated with the at least one airport lounge responsive to the tracked location;
dynamically updating the at least one set of access rules corresponding to the at least one airport lounge responsive to the updated inventory of the corresponding at least one associated airport lounge;
determining, in accordance with the access rules and the at least one access item, a guest access status associated with the user of the associated client device;
receiving, from the associated client device, instructions to transfer the guest access status to a second client device;
determining relative positions of the associated client device and the second client device;
generating routing information specific to each client device, the routing information corresponding to a route to a single physical location;
tracking each client device on route the single physical location; and
updating the route specific to each client device during travel to the single physical location.

17. The computer-implemented method of claim 16, further comprising:
communicating a location of the client device to the associated application server in association with the access request; and
receiving guidance information from the associated application server from the location of the client device to the at least one airport lounge.

18. The computer-implemented method of claim 16, wherein the received access details include a location associated with the at least one airport lounge, access rules associated with access to the at least one airport lounge, and a price associated with access thereto, further comprising:
communicating payment information to the associated application server responsive to the associated price; and
receiving the confirmation information relating to access to the at least one airport lounge in response to the payment communication.

19. The computer-implemented method of claim 16, further comprising:

determining a communication link between the associated management device and the associated application server is non-functional;

communicating, via the second communication link, the confirmation information to the associated management device;

receiving check-in information from the associated management device responsive to the communication of the confirmation information via the second communication link; and communicating the check-in information to the associated application server via the first communication link on behalf of the associated management device.

\* \* \* \* \*